US011760350B2

(12) United States Patent
Hosokawa et al.

(10) Patent No.: US 11,760,350 B2
(45) Date of Patent: Sep. 19, 2023

(54) VEHICLE CONTROL DEVICE

(71) Applicant: TOYOTA JIDOSHA KABUSHIKI KAISHA, Toyota Aichi-ken (JP)

(72) Inventors: Masayuki Hosokawa, Nisshin (JP); Takashi Maeda, Nagoya (JP); Tsunekazu Yasoshima, Nagoya (JP); Soichi Okubo, Okazaki (JP); Yuki Tezuka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/574,958

(22) Filed: Jan. 13, 2022

(65) Prior Publication Data

US 2022/0135032 A1    May 5, 2022

Related U.S. Application Data

(63) Continuation of application No. 16/701,560, filed on Dec. 3, 2019, now Pat. No. 11,260,860.

(30) Foreign Application Priority Data

Dec. 6, 2018    (JP) ................. 2018-228732

(51) Int. Cl.
*B60W 30/14* (2006.01)
*B60W 50/08* (2020.01)
*B60W 50/14* (2020.01)

(52) U.S. Cl.
CPC ........ *B60W 30/146* (2013.01); *B60W 50/085* (2013.01); *B60W 2050/146* (2013.01)

(58) Field of Classification Search
CPC ............ B60W 30/146; B60W 50/085; B60W 2050/146
See application file for complete search history.

(56) References Cited

U.S. PATENT DOCUMENTS 6,116,369 A    9/2000   King et al.
6,497,297 B1   12/2002  Ebert et al.
(Continued)

FOREIGN PATENT DOCUMENTS

JP    2009051487 A    3/2009
JP    2009-208661 A   9/2009
(Continued)

*Primary Examiner* — Jeff A Burke
*Assistant Examiner* — Mohamad O El Sayah
(74) *Attorney, Agent, or Firm* — Dinsmore & Shohl LLP

(57) ABSTRACT

A vehicle control device executes a cruise control to let a vehicle travel in such a manner that an acceleration is equal to a predetermined acceleration, when an execution condition becomes satisfied, and starts a vehicle speed upper limit control to let the vehicle travel in such a manner that the vehicle speed does not exceed an upper limit value determined based on a shape of a curve section, when a start condition becomes satisfied. The vehicle control device starts displaying a display element in a first display mode, when the vehicle speed upper limit control is started. At a time point at which the vehicle speed upper limit control is ended, the vehicle control device starts displaying the display element in a second display mode different from the first display mode if the execution condition is not satisfied.

6 Claims, 10 Drawing Sheets

(56) References Cited

U.S. PATENT DOCUMENTS

| | | | |
|---|---|---|---|
| 2007/0050127 A1* | 3/2007 | Kellum | G01C 21/3697 |
| | | | 340/995.27 |
| 2009/0037064 A1 | 2/2009 | Nakamura et al. | |
| 2010/0082215 A1 | 4/2010 | Miyajima et al. | |
| 2011/0264302 A1 | 10/2011 | Tsunekawa | |
| 2012/0150411 A1 | 6/2012 | Oosawa | |
| 2012/0253628 A1 | 10/2012 | Maruyama | |
| 2015/0100217 A1 | 4/2015 | Sudou et al. | |
| 2016/0365068 A1* | 12/2016 | Sakaguchi | B60K 35/00 |

FOREIGN PATENT DOCUMENTS

| | | |
|---|---|---|
| JP | 2015072604 A | 4/2015 |
| JP | 2017036044 A | 2/2017 |
| JP | 2018058494 A | 4/2018 |
| WO | 2010073300 A1 | 7/2010 |

\* cited by examiner

VEHICLE CONTROL DEVICE

CROSS-REFERENCE TO RELATED APPLICATIONS

This application is a continuation patent application of U.S. patent application Ser. No. 16/701,560, filed Dec. 3, 2019, which claims the priority benefit of co-pending Japanese Patent Application No. 2018-228732, filed Dec. 6, 2018, the entire disclosures of which, including the drawings, are hereby incorporated by reference.

TECHNICAL FIELD

The present disclosure relates to a vehicle control device configured to execute a cruise control and a vehicle speed upper limit control. The cruise control is a control to let a vehicle travel in such a manner that the acceleration is made equal to a cruise control acceleration. The vehicle speed upper limit control is a control to let the vehicle travel in such a manner that the vehicle speed does not exceed a vehicle speed upper limit value determined based on a shape of a curve section, when the vehicle is traveling in the curve section.

BACKGROUND

Hitherto, there has been known a vehicle control device configured to be able to execute both a cruise control and a speed management control. For example, such a device (hereinafter, referred to as "a conventional device") is disclosed in Japanese Patent Application Laid-open No. 2018-58494.

The cruise control is a control to let the vehicle travel in such a manner that an acceleration of the vehicle is made equal to a cruise control acceleration to have the vehicle travel at a predetermined setting vehicle speed or to have the vehicle follow an objective-forward-vehicle.

The speed management control is a control to adjust a vehicle speed of when the vehicle is traveling in the curve section. The speed management control includes a control (a vehicle speed upper limit control) to let the vehicle travel in such a manner that the vehicle speed does not exceed a target vehicle speed determined based on a shape of the curve section.

The conventional device lets the vehicle travel (controls a travelling state of the vehicle) not through the speed management control but through the cruise control at and after an time point at which it is determined that the vehicle exits from (gets out of) the curve section.

Accordingly, the vehicle starts to be accelerated at the above time point.

SUMMARY

Inventors of the present disclosure consider a device (hereinafter, referred to as "a consideration device") configured to display, on a display, a display element indicating that the speed management control is being executed, when the speed management control is being executed. That is, the consideration device displays the display element in order to inform the driver that the speed management control is being executed.

It is considered that the consideration device displays the display element in a mode (a different mode) which is different from a normal mode for displaying the above described display element, in order to inform the driver that the vehicle will start to be accelerated due to an end of the speed management control (the vehicle speed upper limit control), when the vehicle reaches a predetermined control end position in the vicinity of an end position of the curve section. For example, in the different mode, the consideration device blinks/flickers the display element (or turns on the display element intermittently).

Here, the speed management control starts to be executed when the vehicle is about to enter the curve section, regardless of whether or not an execution condition of the cruise control (a cruise control execution condition) is satisfied. When the cruise control execution condition is satisfied at a time point (hereinafter, referred to as a "control end time point") that the vehicle reaches the control end position, the traveling state of the vehicle is controlled through the cruise control after the control end time point. In this case, the driver needs to operate neither an acceleration pedal (an accelerator or an acceleration operator) nor a brake pedal (a decelerator or a deceleration operator). In other words, the driver does not have to perform an acceleration-deceleration operation. Whereas, when the cruise control execution control is not satisfied at the control end time point, the driver has to perform the acceleration-deceleration operation.

Necessity that the driver notices that the speed management control is ended is lower when the cruise control execution condition is satisfied at the control end time point than when the cruise control execution condition is not satisfied at the control end time point. Thus, if the display element is displayed in the different mode when the cruise control execution condition is satisfied at the control end time point, the display element displayed in the different mode may annoy the driver and may cause the driver to erroneously notice that the driver has to perform the acceleration-deceleration operation.

The present disclosure has been made to solve the problem described above. The present disclosure has an object to provide a vehicle control device to lower a possibility that the display element displayed in the different mode annoys the driver, and further lower a possibility that the driver erroneously notices that the driver has to perform the acceleration-deceleration operation although the traveling state of the vehicle is controlled through the cruise control, when the cruise control execution condition is satisfied at the control end time point.

A vehicle control device according to the present disclosure comprises:

1. A vehicle control device comprising:

sensing devices (12, 13) configured to acquire information on at least a traveling state of a vehicle;

actuators (26, 34) configured to control the traveling state of the vehicle; and a controller (10, 20, 30, 40) configured to:

execute a cruise control to let the vehicle travel using the information and the actuators in such a manner that an acceleration of the vehicle is equal to a predetermined cruise control acceleration (Step 425, Step 427, Step 429), when a predetermined cruise control execution condition is satisfied ("Yes" at Step 415, "No" at Step 430); and start a vehicle speed upper limit control to let the vehicle travel using the information and the actuators in such a manner that a vehicle speed of the vehicle does not exceed a vehicle speed upper limit value (Vstgt) determined based on a shape of a curve section (Step 610, Step 625), when a start condition becomes satisfied ("Yes" at Step 540), the start condition being a condition which is satisfied at least when the vehicle reaches a predetermined control start position (Lstart) defined with respect to a start position of the curve section regardless of whether or not the predetermined cruise control execution condition is satisfied.

The control device is configured to:
wherein the controller is configured to:
start displaying a predetermined display element (DEspm) in a first display mode, when the vehicle speed upper limit control is started (Step 545, Step 715);
end the vehicle speed upper limit control, when an end condition becomes satisfied while the vehicle speed upper limit control is being executed ("Yes" at Step 615, "Yes" at Step 910), the end condition being a condition to be satisfied when the vehicle reaches a predetermined control end position (SCend) defined with respect to an end position of the curve section;
end displaying the predetermined display element in the first display mode ("No" at Step 705, "No" at Step 710) if the predetermined cruise control execution condition is satisfied at an end time point at which the end condition becomes satisfied ("No" at Step 635, "No" at Step 920); and
start displaying the predetermined display element in a second display mode which is different from the first display mode (Step 645, Step 925, "Yes" at Step 710, Step 740) if the predetermined cruise control execution condition is not satisfied at the end time point ("No" at Step 635, "No" at Step 920).

When the vehicle speed upper limit control end condition becomes satisfied, the control device starts displaying the display element in the second display mode which is different from the first display mode, if the cruise control execution condition is not satisfied. The driver can notice that the driver needs to perform an acceleration-deceleration operation because the vehicle speed upper limit control is ended/stopped. Whereas, when the vehicle speed upper limit control end condition becomes satisfied, the control device ends displaying the display element and does not start displaying the display element in the second display mode, if the cruise control execution condition is satisfied. Accordingly, a possibility that the display element displayed in the second display mode annoys the driver can be lowered. Furthermore, a possibility that the driver erroneously notices that the driver needs to perform the acceleration-deceleration operation can be lowered, although the driver need not to perform the acceleration-deceleration operation because the vehicle is controlled through the cruise control.

In one embodiment of the present disclosure,
the curve section includes:
a first clothoid section (KR1) in which a curvature gradually increases up to a constant value gradually;
a static circle section (SC) in which the curvature remains at the constant value; and
a second clothoid section (KR2) in which the curvature gradually decreases from the constant value gradually, and
the vehicle control device is configured to determine that the end condition becomes satisfied ("Yes" at Step 615, "Yes" at Step 910) when the vehicle reaches an end position (SCend) of the static circle section.

The vehicle speed upper limit control is ended/stopped when the vehicle reaches a position from which the driver feel uneasy if the vehicle starts to be accelerated. Accordingly, the possibility that the driver feels uneasy can be lowered.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAILED DESCRIPTION

A vehicle control device according to one embodiment of the present disclosure (hereinafter, referred to as "the present control device") is installed in a vehicle VA (referring to FIG. 2).

Figure 1:
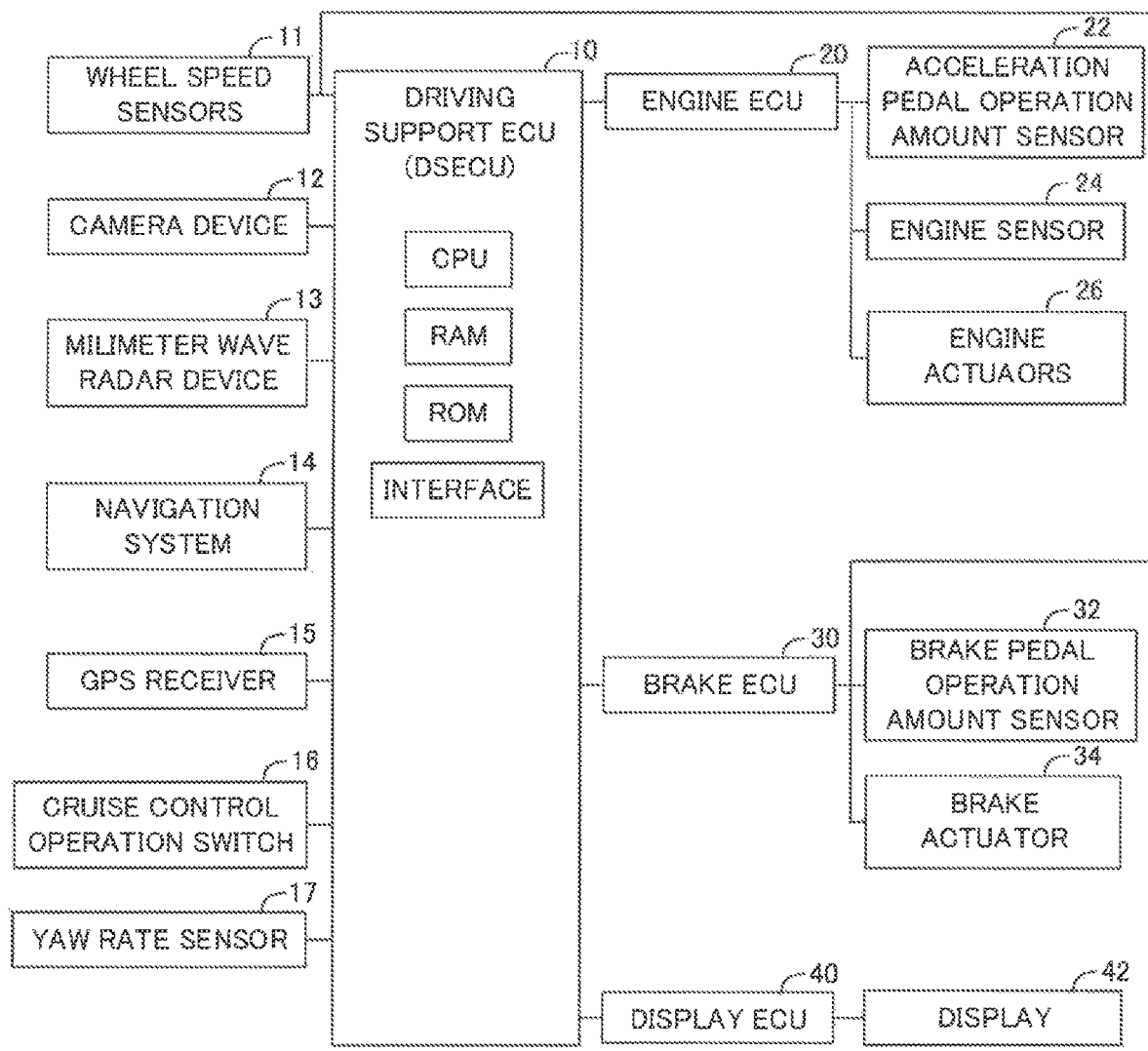
FIG. 1 is a schematic system configuration diagram of a vehicle control device (the present control device) according to an embodiment.

As shown in FIG. 1, the present control device comprises a driving support ECU (hereinafter, referred to as a "DSECU") 10, an engine ECU 20, a brake ECU 30, and a display ECU 40. Those ECUs are connected to each other via an unillustrated controller area network (CAN) to be able to mutually transmit and receive information to/from those ECUs.

In the present specification, the ECU is an abbreviation of an "Electronic Control Unit". The ECU is an electronic control circuit which includes a microcomputer having a CPU, a ROM, a RAM, an interface I/F, and the like, as main components. The CPU achieves various functions through executing instructions (routines) stored in the ROM. Some or all of those ECUs may be integrated into a single ECU.

Furthermore, the present control device comprises a plurality of wheel speed sensors 11, a camera device 12, a millimeter wave radar device 13, a navigation system 14, a GPS receiver 15, a cruise control operation switch 16, and a yaw rate sensor 17. Those are connected to the DSECU 10.

Each of the wheel speed sensors 11 is provided for a wheel of the vehicle VA. Each of the wheel speed sensors 11 generates one pulse signal (a wheel pulse signal), when the corresponding wheel rotates by a predetermined angle. The DSECU 10 counts the number of the pulse signals transmitted from each of the wheel speed sensors 11 for/within a predetermined time to calculate a rotation speed (a wheel speed) of the corresponding wheel based on the counted number of the pulse signals. The DSECU 10 calculates a vehicle speed Vs indicating a speed of the vehicle VA based on the rotation speeds of the wheels. For example, the DSECU 10 calculates the average of the rotation speeds of the four wheels as the vehicle speed Vs.

The camera device 12 is arranged at an upper part of a windshield in a cabin. The camera device 12 obtains image data of an image (a camera image) ahead of the vehicle VA. The camera device 12 obtains, from the obtained image data, object information on object (s) and the like. The object information includes a distance to an obstacle, a direction of the obstacle, and the like.

The millimeter wave radar device 13 comprises an unillustrated millimeter wave transmission and reception unit and an unillustrated processing unit. The millimeter wave radar device 13 is arranged at a position which is a front end of the vehicle VA and a center in a vehicle width direction. The millimeter wave transmission and reception unit transmits a millimeter wave which spreads to an area with a predetermined angle in a right direction and a left direction from a center axis extending in a forward direction of the vehicle VA. The object (e.g. another vehicle, a pedestrian, a two-wheeled vehicle (e.g. a motorcycle, or a bicycle)) reflects the transmitted millimeter wave. The millimeter transmission and reception unit receives such a reflected wave.

The processing unit of the millimeter wave radar device 13 obtains, as object information, a distance to the object, a relative speed Vfx(n) of the object with respect to the vehicle VA, a direction of the object with respect to the vehicle VA, and the like based on the reflected wave. If the object is the other vehicle, the distance to the other vehicle is referred to as an inter-vehicle distance Dfx(n). The direction of the object with respect to the vehicle VA is an angle between a straight line passing through a position of the object and a position of the millimeter wave transmission and reception unit of the millimeter wave radar device 13 and the above described center line.

More specifically, the processing unit obtains the object information based on a time period from a time point at which the millimeter wave is transmitted to a time point at which the reflected wave of the millimeter wave is received, an attenuation level of the reflected wave, a phase difference between the transmitted millimeter wave and the received reflected wave, and the like.

The DSECU 10 obtains final object information used though a cruise control described later by modifying the object information obtained by the millimeter wave radar device 13 based on the object information obtained by the camera device 12.

The navigation system 14 has stored map data (navigation information) including a position of a curve section CRV on the earth's surface, a curvature of the curve section CRV, and the like in advance.

The GPS receiver 15 receives GPS signals from GPS satellites, every time a predetermined time elapses. The GPS receiver 15 specifies/identifies the present position Lp of the vehicle VA on the earth's surface based on the received GPS signals. Subsequently, the CPU transmits a position signal enabling the DSECU 10 to specify/identify the present position Lp of the vehicle VA to the DSECU 10.

The cruise control operation switch 16 includes a button(s) which a driver of the vehicle VA operates when the driver wants to start or end the cruise control. The cruise control operation switch 16 transmits, to the DSECU 10, a cruise control start signal indicating that the driver is requesting the DSECU 10 to start the cruise control (the cruise control start signal indicating a request of the driver for starting the cruise control), when the driver operates the cruise control operation switch 16 while the cruise control is not being executed. The cruise control operation switch 16 transmits, to the DSECU 10, a cruise control end signal indicating that the driver is requesting the DSECU 10 to end the cruise control (the cruise control end signal indicating a request of the driver for ending the cruise control), when the driver operates the cruise control operation switch 16 while the cruise control is being executed.

In addition, a setting switch (not shown) is provided in the vicinity of the cruise control operation switch 16. The driver operates the setting switch in order to change/set a target inter-vehicle time period Ttgt used by an adaptive cruise control (ACC) described later, and a target vehicle speed used through a constant speed traveling control described later.

The yaw rate sensor 17 measures a yaw rate Yr acting on the vehicle VA to transmit a signal indicating the measured yaw rate Yr.

The engine ECU 20 is connected to an acceleration pedal operation amount sensor 22 and engine sensors 24. The engine ECU 20 receives detection signals which are transmitted from those sensors.

The acceleration pedal operation amount sensor 22 measures an operation amount of an un illustrated acceleration pedal of the vehicle VA. The operation amount of the acceleration pedal is referred to as "an acceleration pedal operation amount AP". The acceleration pedal operation amount AP is "0" when the driver does not operate the acceleration pedal.

The engine sensors 24 measure various driving state amounts of "a gasoline-fuel injection, spark-ignition-type, and multi-cylinder engine (not shown) which is a driving source of the vehicle VA". The engine sensors 24 include a throttle valve opening degree sensor, an engine rotation speed sensor, an intake air amount sensor, and the like.

Furthermore, the engine ECU 20 is connected to engine actuators 26 such as a throttle valve actuator and fuel injectors. The engine ECU 20 changes torque generated by the engine through driving the engine actuators 26 to adjust driving force acting on the vehicle VA.

The engine ECU 20 determines a target throttle valve opening degree TAtgt in such a manner that the throttle valve opening degree TAtgt becomes larger as the acceleration pedal operation amount AP becomes larger. The engine ECU 20 drives the throttle valve actuator in such a manner that an opening degree of a throttle valve coincides with the target throttle valve opening degree TAtgt.

The brake ECU 30 is connected to the wheel speed sensors 11 and a brake pedal operation amount sensor 32. The brake ECU 30 receives detection signals which are transmitted from those sensors.

The brake pedal operation amount sensor 32 measures an operation amount of an unillustrated brake pedal of the vehicle VA. The operation amount of the brake pedal is referred to as "a brake pedal operation amount BP". The brake pedal operation amount BP is "0" when the driver does not operate the brake pedal.

The brake ECU 30 calculates the rotation speed of each of the wheels and the vehicle speed Vs based on the wheel pulse signals which are transmitted from the wheel speed sensors 11, in the same manner as the DSECU 10 (similarly to the DSECU 10). In some embodiments, the brake ECU 30 may obtain, from the DSECU 10, the rotation speed of each of the wheels and the vehicle speed Vs calculated by the DSECU 10. In this case, the brake ECU 30 needs not to be connected to the wheel speed sensors 11.

The brake ECU 30 is connected to a brake actuator 34 which is a hydraulic control actuator. The brake actuator 34 is provided in an unillustrated hydraulic circuit between an unillustrated master cylinder and unillustrated friction brake devices. The master cylinder pressurizes working oil by using a depressing force acting on the brake pedal. The frictional brake device includes well-known wheel cylinders. The wheel cylinders are provided in the wheels respectively. The brake actuator 34 adjusts oil pressure applied to each of the wheel cylinders so as to adjust brake force of the vehicle VA.

The brake ECU 30 determines a target acceleration GBPtgt that has a negative value (a target deceleration with a positive value) based on the brake pedal operation amount BP. The brake ECU 30 drives the brake actuator 34 in such a manner that an actual acceleration of the vehicle VA is made equal to the target acceleration.

The display ECU 40 is connected to a display 42. The display ECU 40 displays, on the display 42, a speed management (SPM) display element DEspm (referring to FIG. 2) described later in response to a display request from the DSECU 10. For example, the display 42 is a meter display. A speed meter for informing the driver of the vehicle speed at the present time point are displayed on the meter display.

(Detail Description of Vehicle Control)

1. Cruise Control (ACC)

The DSECU 10 executes, as the cruise control, either (any) one of a distance maintaining control and a constant speed traveling control, while a cruise control execution condition described later is being satisfied.

1.1: ACC Target Acceleration for the Distance Maintaining Control

The DSECU 10 determines/specifies another vehicle ahead of the vehicle VA (hereinafter, referred to as an "objective-forward-vehicle (a)" or "follow-up vehicle ahead (a)") which the vehicle VA should follow (i.e., trail), according to a well-known method. For example, such a method is disclosed in Japanese Patent Application Laid-open No. 2015-072604. The DSECU 10 calculates a target inter-vehicle distance Dtgt (=Ttgt*Vs) between the vehicle VA and the objective-forward-vehicle (a) by multiplying a target inter-vehicle time period Ttgt by the vehicle speed Vs. The driver sets the target inter-vehicle time period Ttgt to a driver's desired value by operating the setting switch. However, the target inter-vehicle time period Ttgt may be a fixed value.

The DSECU 10 calculates a distance deviation $\Delta D1$ (=Dfx(a)−Dtgt) by subtracting the target inter-vehicle distance Dtgt from "an inter-vehicle distance Dfx(a) which is a distance between the objective-forward-vehicle (a) and the vehicle VA". The DSECU 10 calculates a cruise control (CRS) target acceleration GCRStgt by applying the distance deviation $\Delta D1$ to the following equation (1). Vf(x) in the equation (1) indicates a relative speed of the objective-forward-vehicle (a). Furthermore, each of "Ka1", "K1", and "K2" in the equation (1) indicates a predetermined control gain (coefficient). "Vfx(a)" in the equation (1) is defined as a value which is a positive value and becomes larger as the inter-vehicle distance Dfx(a) becomes longer.

$$GCRStgt = Ka1 \cdot (K1 \cdot \Delta D1 + K2 \cdot Vfx(a)) \quad (1)$$

1.2: ACC Target Acceleration for the Constant Speed Traveling Control

When the DSECU 10 detects no objective-forward-vehicle (a), the DSECU 10 controls an acceleration of the vehicle VA in such a manner that the vehicle speed Vs of the vehicle VA coincides with (or becomes equal to) the target vehicle speed for the constant speed traveling control. For example, the driver sets the target vehicle speed for the constant speed traveling control to a driver's desired value by operating the cruise control operation switch 16. When the vehicle speed Vs is lower than the target vehicle speed, the DSECU 10 sets the CRS target acceleration GCRStgt to a positive constant value (Gtgt) or increases the CRS target acceleration GCRStgt gradually by a predetermined amount $\Delta G$ per a predetermined time. When the vehicle speed Vs is higher than the target vehicle speed, the DSECU 10 sets the CRS target acceleration GCRStgt to a negative constant value (−Gtgt) or decreases the CRS target acceleration GCRStgt gradually by the predetermined amount $\Delta G$ per the predetermined time.

1.3: Execution of ACC

The DSECU 10 transmits the thus calculated CRS target acceleration GCRStgt to the engine ECU 20 and the brake ECU 30 as a driving support target acceleration GDStgt when a speed management control described later is not being executed. The DSECU 10 transmits, to the engine ECU 20 and the brake ECU 30, either one of the CRS target acceleration GCRStgt and a SPM target acceleration described later, whichever is smaller, as the driving support target acceleration GDStgt, when the speed management control is being executed.

The engine ECU 20 increases or decreases the target throttle valve opening degree TAtgt in such a manner that an actual acceleration in the longitudinal direction of the vehicle VA (hereinafter, simply referred to as "an actual acceleration dg") coincides with the driving support target acceleration GStgt transmitted from the DSECU 10. Furthermore, the brake ECU 30 controls the brake force using the brake actuator 34 in such a manner that the actual acceleration dg of the vehicle VA coincides with the driving support target acceleration GStgt, when the actual acceleration dg is larger than the driving support target acceleration GStgt even when and after the target throttle valve opening degree TAtgt becomes "0 (the minimum value)". As a result, the vehicle VA is decelerated. It should be noted that the brake ECU 30 determines/adopts either one of "a target acceleration determined depending on the brake pedal operation amount BP" and "the driving support target acceleration GStgt", whichever is smaller, as a final target acceleration. Thereafter, the brake ECU 30 controls the brake actuator 34 based on the determined final target acceleration. In other words, the brake ECU 30 is configured to execute a brake override.

As described above, the engine ECU 20 determines the target throttle valve opening degree TAtgt based on the acceleration pedal operation amount AP. When the target throttle valve opening degree TAtgt determined based on the acceleration pedal operation amount AP is larger than the target throttle valve opening degree TAtgt determined based on the driving support target acceleration GStgt, the engine ECU 20 controls an actual throttle valve opening degree TA based on the target throttle valve opening degree TAtgt determined based on the acceleration pedal operation amount AP. In other words, the engine ECU 20 is configured to execute an acceleration override.

As described above, the cruise control can be expressed as a control to let the vehicle VA travel in such a manner that the actual acceleration dg of the vehicle VA coincides with the predetermined cruise control target acceleration GCRStgt.

2. Speed Management Control

When the vehicle VA is traveling in the curve section CRV (referring to FIG. 2), the DSECU 10 controls the traveling state of the vehicle VA in such a manner that the vehicle VA can travel in the curve section CRV stably, regardless of whether or not the cruise control execution condition is satisfied. That control is referred to as a speed management control. The speed management control will be described with reference to FIG. 2. The DSECU 10 determines any one of a deceleration control, a vehicle speed maintaining control, and an acceleration control in order based on a traveling position of the vehicle VA in the curve section CRV, and executes the determined control as the speed management control. Each of the deceleration control and the vehicle speed maintaining control is a control to let the vehicle VA travel in such a manner that the vehicle speed Vs does not exceed a target vehicle speed Vstgt determined based on a shape of the curve section CRV. The deceleration control and the vehicle speed maintaining control may be referred to as "a vehicle speed upper limit control".

Firstly, the curve section CRV will be described.

Figure 2:
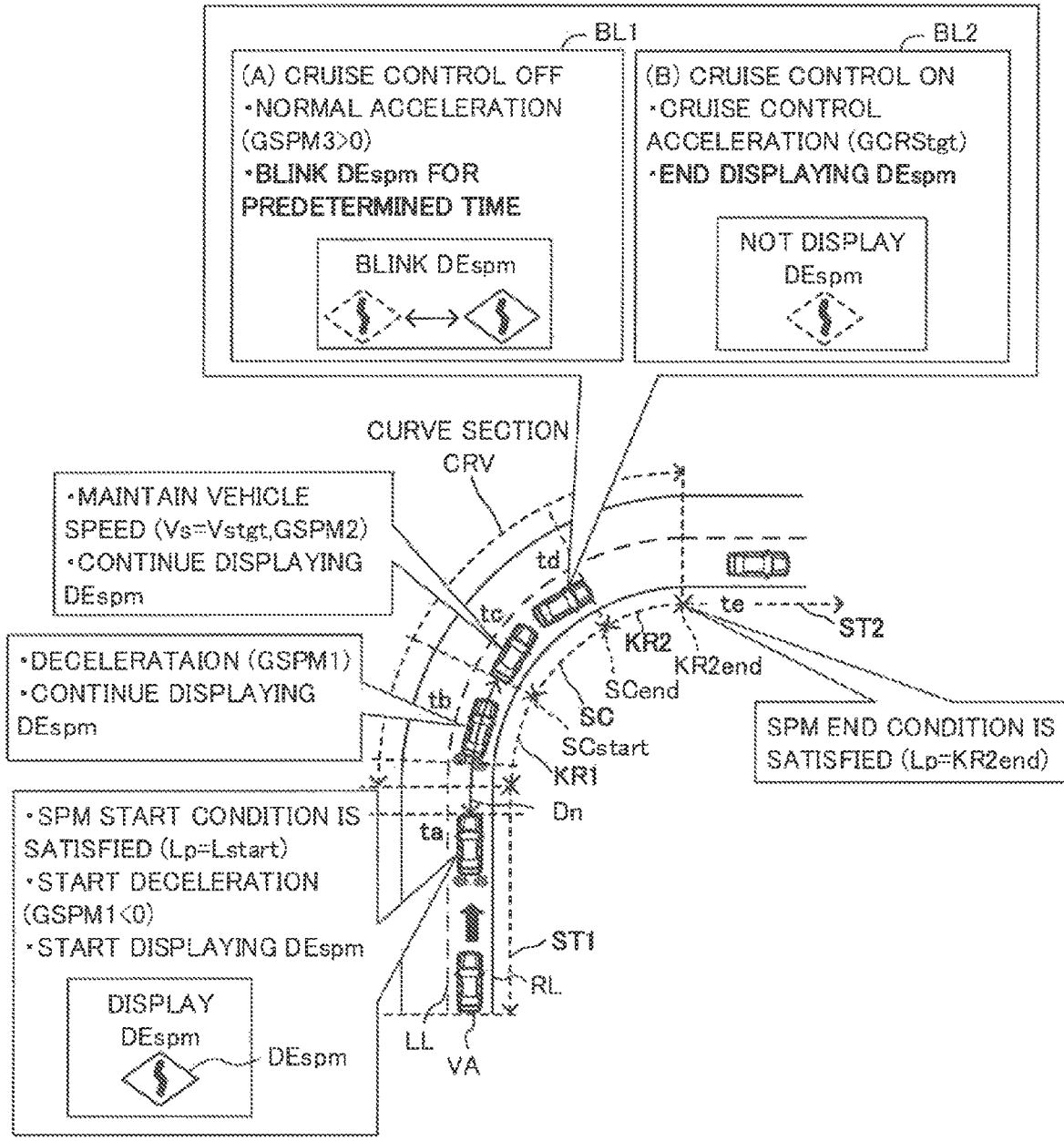
FIG. 2 is a diagram illustrating an operation of the present control device when a vehicle travels in a curve section.
Figure 3:
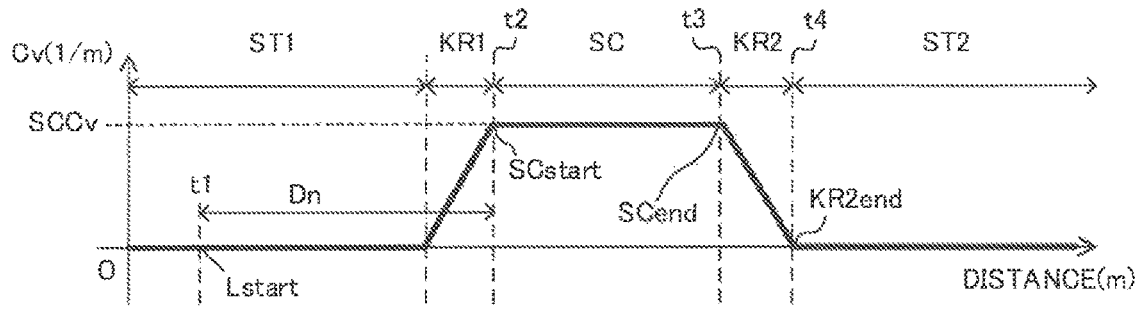
FIG. 3 is a diagram illustrating timings that the vehicle is accelerated and decelerated, timings that a SPM display element is displayed, not displayed, and blinked.
Figure 3:
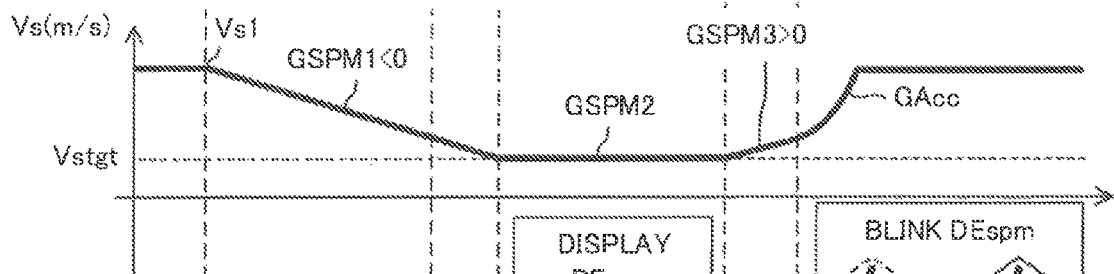
Figure 3:
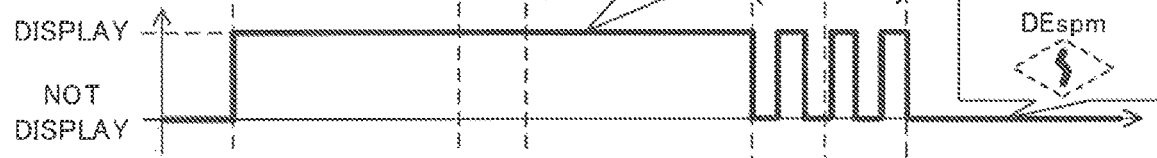
Figure 3:
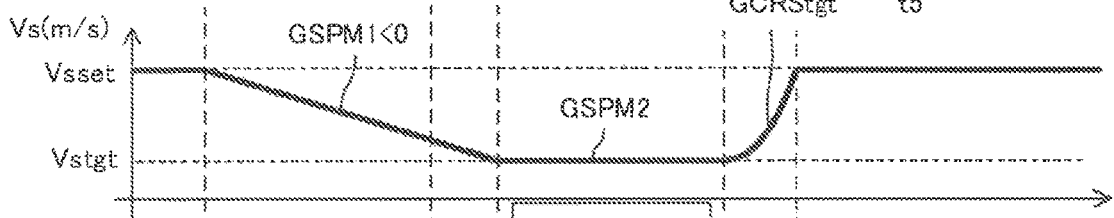
Figure 3:
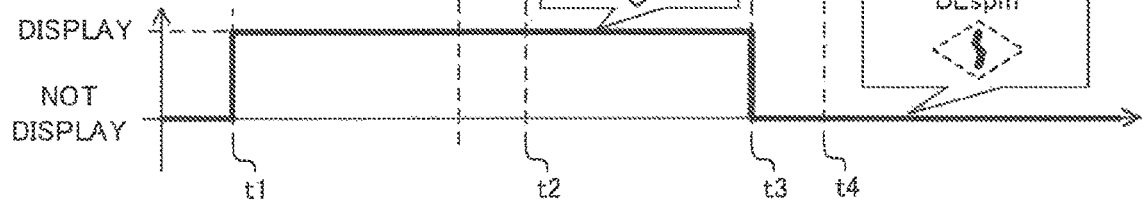

As shown in FIG. 2, the curve section CRV typically comprises/has a first clothoid section KR1, a static circle section SC, and a second clothoid section KR2. The vehicle VA travels in the first clothoid section KR1, the static circle section SC, and the second clothoid section KR2 in that order. As shown in FIG. 3, the first clothoid section KR1 is a section of the curve section CRV, of which magnitude of a curvature Cv becomes larger gradually. The static circle section SC is a section of the curve section CRV, of which magnitude of the curvature Cv remains at a constant value. The second clothoid section KR2 is a section of the curve section CRV, of which magnitude of the curvature Cv becomes smaller gradually.

2.1 Start Position Lstart of Speed Management Control

"Map data (road data or navigation data) which includes a location of the curve section Cv on the earth's surface, a curvature of the curve section Cv, and the like" has been stored in the navigation system 14 in advance. The DSECU 10 refers to the map data stored in the navigation system 14 to acquire the curvature Cv of a lane in which the vehicle VA is traveling at a predetermined position in a traveling direction. Hereinafter, the lane may be referred to as "a self-lane" or "a currently-running-road". The DSECU 10 determines whether or not there is the curve section CRV within a predetermined distance from the present position Lp. The present position Lp is acquired by the GPS receiver 15. When the DSECU 10 determines that there is the curve section CRV within the predetermined distance, the DSECU 10 specifies a curvature Cv of the static circle section SC of the curve section CRV nearest to the vehicle VA, and acquires a reciprocal (=1/Cv) of the curvature Cv as a curvature radius R. Subsequently, the DSECU 10 acquires the target vehicle speed Vstgt by applying the curvature radius R to a target vehicle speed map MapVstgt(R) which has been stored in the ROM (referring to a block BL shown in FIG. 5).

The DSECU 10 calculates a traveling distance Dn which is necessary for the vehicle speed Vs to coincide with the target vehicle speed Vstgt at a time point at which the vehicle VA reaches a start position SCstart (referring to FIG. 2) of the static circle section SC while the vehicle VA is decelerating at a predetermined negative acceleration (GSPM1<0). The DSECU 10 determines, as a start position Lstart of the speed management control, a position the traveling distance Dn (referring to FIG. 2) away from the start position SCstart of the static circle SC on the vehicle VA's present position Lp side (toward the vehicle VA) along the self-lane. The start position Lstart may be referred to as "a control start position".

At a time point ta shown in FIG. 2, the vehicle VA reaches the start position Lstart, so that the speed management start condition becomes satisfied. The DSECU 10 starts the speed management control at the time point ta.

2.2: Deceleration Control

The DSECU 10 executes the deceleration control to decelerate the vehicle VA during a time period from a time point at which the speed management control start condition becomes satisfied (that is, a time point at which the vehicle VA reaches the start position Lstart) to a time point at which the vehicle VA reaches the start position SCstart of the static circle section SC. The deceleration control is a control to decrease the vehicle speed Vs to the target vehicle speed Vstgt at a predetermined negative acceleration GSPM1. The deceleration control is executed in order to make the vehicle speed Vs equal to the target vehicle speed Vstgt. The DSECU 10 sets a SPM target acceleration GSPMtgt to the predetermined negative acceleration GSPM1 during the time period.

At the time point to shown in FIG. 2, the speed management start condition becomes satisfied so that the DSECU 10 starts the deceleration control. At a time point tb at which the vehicle VA is traveling in the first clothoid section KR1, the deceleration control is continued. As a result of the deceleration control, at a time point at which the vehicle VA reaches the start position SCstart of the static circle section SC, the vehicle speed Vs coincides with the target vehicle speed Vstgt.

2.3: Vehicle Speed Maintaining Control

During a time period from a time point at which the vehicle VA reaches the start position SCstart of the static circle section SC to a time point at which the vehicle VA reaches an end position SCend of the static circle section SC (that is, while the vehicle VA is traveling in the static circle section SC), the DSECU 10 executes the vehicle speed maintaining control. The vehicle speed maintaining control is a control to maintain/keep the vehicle speed Vs at the target vehicle speed Vstgt. More specifically, the DSECU 10 calculates an acceleration GSPM2 to have/let the vehicle VA travel in the static circle section SC with maintaining the vehicle speed Vs at the target vehicle speed Vstgt, and sets the SPM target acceleration GSPMtgt to the GSPM2.

At a time point tc shown in FIG. 2, the vehicle VA is traveling in the static circle section SC. Therefore, at the time point tc, the vehicle speed maintaining control is executed, and the SPM target acceleration GSPMtgt is set to the acceleration GSPM2.

The vehicle speed Vs is decreased down to the target vehicle speed Vstgt through the deceleration control. Thereafter, the vehicle speed Vs is kept at the target vehicle speed Vstgt through the vehicle speed maintaining control. Each of the deceleration control and the vehicle speed maintaining control is a control to be executed so that the vehicle speed Vs does not exceed the target vehicle speed Vstgt. Accordingly, the deceleration control and the vehicle speed maintaining control may be referred to as "the vehicle speed upper limit control".

2.4: Acceleration Control

The DSECU 10 executes the acceleration control to accelerate the vehicle VA during a time period from a time point (a time point td shown in FIG. 2) at which the vehicle VA reaches the end position SCend of the static circle section SC to a time point (a time point to shown in FIG. 2) at which the vehicle VA reaches an end position KR2end of the second clothoid section KR2.

More specifically, the DSECU 10 sets the SPM target acceleration GSPMtgt to a positive acceleration GSPM3 which has the same magnitude as the magnitude of the negative acceleration GSPM1, when the cruise control is not executed at a time point at which the vehicle VA reaches the end position SCend of the static circle section SC. Whereas, the DSECU 10 sets the SPM target acceleration GSPMtgt to the CRS target acceleration GCRStgt when the cruise control is executed at the time point at which the vehicle VA reaches the end position SCend of the static circle section SC.

The end position SCend of the static circle section SC is a position at which the curve section CRV is about to end, and at which the vehicle speed maintaining control is ended so that the vehicle speed upper limit control is ended. The end position SCend may be referred to as "a control end position".

When the vehicle VA reaches the end position KR2end of the second clothoid section KR2 (that is, the vehicle VA reaches an end position of the curve section CRV) at a time point te shown in FIG. 2, the DSECU 10 determines that the speed management end condition becomes satisfied to end the speed management control. At and after the time point te, if the cruise control execution condition is not satisfied, the vehicle VA is controlled in such a manner that the actual acceleration dg coincides with the target acceleration determined depending on the acceleration pedal operation amount AP and the brake pedal operation amount BP. Whereas, if the cruise condition execution condition is satisfied, the vehicle VA is controlled in such a manner that the actual acceleration dg coincides with the CRS target acceleration GCRStgt.

While the speed management control is being executed, the DSECU 10 transmits the SPM target acceleration GSPMtgt, as the driving support acceleration GStgt, to the engine ECU 20 and the brake ECU 30, if the cruise control execution condition is not satisfied. Whereas, as described above, the DSECU 10 transmits either one of the CRS target acceleration GCRStgt and the SPM target acceleration GSPMtgt, whichever is smaller, as the driving support target acceleration GStgt, to the engine ECU 20 and the brake ECU 30 if the cruise control execution condition is satisfied.

(Outline of Operation)

The DSECU 10 displays a SPM display element DEspm (referring to FIG. 2 and FIG. 3) on a display 42 during a time period from a time point at which the speed management control is started (referring to the time point to shown in FIG. 2) to a time point at which the vehicle VA reaches the end position SCend of the static circle section SC (referring to the time point td shown in FIG. 2). That is, the SPM display element DEspm is displayed during a time period in which any one of the deceleration control and the vehicle speed maintaining control in the speed management control is being executed (that is, during a time period in which the vehicle speed upper limit control is being executed). When the SPM display element DEspm is displayed, the driver can notice that the speed management control is being executed and either one of the deceleration control and the vehicle speed maintaining control is being executed in the speed management control.

When the cruise control execution condition is satisfied at a control end time point at which the vehicle speed upper limit control is ended due to the end of the vehicle speed maintaining control, the traveling state of the vehicle VA is controlled through the cruise control. In this case, the driver does not have to operate the acceleration pedal (the accelerator) and the brake pedal (the decelerator) (i.e., the driver does not have to perform the acceleration-deceleration operation) after the speed management control is ended (in order to let the vehicle VA run stably and continuously). Whereas, when the cruise control execution condition is not satisfied at the control end time point, the driver needs to perform the acceleration-deceleration operation (in order to let the vehicle VA run stably and continuously).

In some embodiments, when the cruise control execution condition is not satisfied at the control end time point at which the vehicle speed upper limit control is ended, the driver may be notified that the vehicle speed maintaining control is ended so that the driver needs to perform the acceleration-deceleration operation (in order to let the vehicle VA run stably and continuously). Whereas, when the cruise control execution condition is satisfied at the control end time point, such a notification is not necessary.

In view of the above, the DSECU 10 is configured to determine whether or not the cruise control execution condition is satisfied at the control end time point at which the vehicle VA reaches the end position SCend of the static circle section SC (at the time point at which the vehicle speed upper limit control is ended). When the cruise control execution condition is not satisfied at the control end time point, the DSECU 10 blinks the SPM display element DEspm in a blinking time period from the control end time point to a time point at which a predetermined time elapses from the control end time point (referring to a block BL1 shown in FIG. 2) in order to notify the driver that the vehicle speed maintaining control is ended so that the driver needs to perform the acceleration-deceleration operation to let the vehicle VA run stably and continuously. When the blinking time period ends, the DSECU 10 ends blinking the SPM display element DEspm, so that the SPM display element DEspm is no longer displayed on the display 42.

Whereas, when the cruise control execution condition is satisfied at the control end time point at which the vehicle VA reaches the end position SCend of the static circle section SC, the DSECU 10 ends displaying the SPM display element DEspm (referring to a block BL2 shown in FIG. 2).

When the cruise control execution condition is not satisfied at the control end time point at which the vehicle VA reaches the end position SCend of the static circle section SC (that is, the time point at which the vehicle speed upper limit control is ended), the driver needs not to perform the acceleration-deceleration operation after the control end time point. Therefore, in this case, at the control end time point, the DSECU 10 ends displaying the SPM display element DEspm, and does not start blinking the SPM display element DEspm. Accordingly, a possibility that blinking the SPM display element DEspm annoys the driver can be lowered, and a possibility that the driver erroneously notices that the acceleration-deceleration operation is necessary to let the vehicle VA run stably and continuously, although the driver needs not to perform the acceleration-deceleration operation.

(Operation)

An operation of the present control device of when the cruise control condition is not satisfied will be described with reference to (A) though (C) of FIG. 3.

In an example shown in (A) through (C) of FIG. 3, the vehicle VA reaches the start position Lstart of the speed management control at a time point t1. As shown in (B) of FIG. 3, the SPM start condition is satisfied at the time point t1 because the vehicle speed Vs1 at the time point t1 is higher than the target vehicle speed Vstgt. Accordingly, the DSECU 10 starts the deceleration control in the speed management control at the time point t1. As shown in (B) of FIG. 3, the DSECU 10 sets the SPM target acceleration GSPMtgt to the predetermined acceleration GSPM1 (<0), and controls the vehicle VA in such a manner that the actual acceleration dg coincides with the SPM target acceleration GSPMtgt, through the deceleration control. Furthermore, as shown in (C) of FIG. 3, the DSECU 10 starts displaying the SPM display element DEspm at the time point t1.

The DSECU 10 continues to execute the deceleration control as shown in (B) of FIG. 3, and continues to display the SPM display element DEspm as shown in (C) of FIG. 3, during a time period from the time point t1 to a time point t2 at which the vehicle VA reaches the start position SCstart of the static circle section SC.

At the time point t2, the vehicle VA reaches the start position SCstart, and the vehicle speed Vs coincides with the target vehicle speed Vstgt. The DSECU 10 starts the vehicle speed maintaining control to maintain the vehicle speed Vs at the target vehicle speed Vstgt at and after the time point t2. The DSECU 10 continues to execute the vehicle speed maintaining control as shown in (B) of FIG. 3, and continues to display the SPM display element DEspm as shown in (C) of FIG. 3, during a time period from the time point t2 to a time point t3 at which the vehicle VA reaches the end position SCend of the static circle section SC. In other words, the vehicle speed maintaining control continues being executed and the SPM display element continues being displayed during a time period in which the vehicle VA is traveling in the static circle section SC.

As described above, the cruise control execution condition is not satisfied at the time point t3. Therefore, the DSECU 10 starts executing the acceleration control with a predetermined positive acceleration GSPM3, as shown in (B) of FIG. 3, and starts blinking the SPM display element DEspm as shown in (C) of FIG. 3, at the time point t3. The DSECU 10 continues executing the acceleration control as shown in (B) of FIG. 3, during a time period from the time point t3 to a time point t4 at which the vehicle VA reaches the end position KR2end of the second clothoid section KR2. Furthermore, the DSECU 10 continues blinking the SPM display element DEspm as shown in (C) of FIG. 3, during a time period from the time point t3 to a time point t5 at which a predetermined time elapses from the time point t3.

At the time point t4, the vehicle VA reaches the end position KR2end of the second clothoid section KR2 so that the SPM end condition is ended. Thus, at the time point t4, the DSECU 10 ends the speed management control. Accordingly, the vehicle VA travels/runs at an acceleration GAcc varying/determined depending on the acceleration-deceleration operation performed by the driver at and after the time point t4.

As described above, when the cruise control execution condition is not satisfied at the time point t3 at which the vehicle VA reaches the end position SCend of the static circle section SC, the DSECU 10 blinks the SPM display element DEspm for the blinking time period from the time point t3 to the time point t5. Accordingly, the blinking of the SPM display element DEspm allows/causes the driver to notice that the speed management control will be ended soon so that the acceleration-deceleration operation is and will be necessary in order to let the vehicle VA run stably and continuously.

An operation of the present control device of when the cruise control execution condition is satisfied will be described with reference to (A), (B'), and (C') of FIG. 3.

The DSECU 10 continues executing the deceleration control and the vehicle speed maintaining control, and continues displaying the SPM display element DEspm during the time period from the time point t1 to the time point t3, in the same manner as the above described example.

As described above, the cruise control execution condition is satisfied. Therefore, as shown in (B') of FIG. 3, the DSECU 10 executes the acceleration control using the CRS target acceleration GCRStgt during the time period from the time point t3 to the time point t4. At and after the time point t4, the traveling state of the vehicle VA is controlled in such a manner that the actual acceleration dg coincides with the CRS target acceleration GCRStgt, since the cruise control execution condition continues to be satisfied.

Furthermore, the cruise condition execution condition is satisfied at the time point t3 at which the vehicle speed maintaining control ends, so that the DSECU 10 ends displaying the SPM display element DEspm as shown in (C') of FIG. 3. In this manner, the DSECU 10 ends displaying the SPM display element DEspm and does not blink the DEspm, when the driver needs not to perform the acceleration-deceleration operation after the vehicle speed upper limit control is ended. Accordingly, the possibility that blinking the SPM display element DEspm annoys the driver can be lowered. Furthermore, the possibility that the driver erroneously notices that the acceleration-deceleration operation is necessary in order to let the vehicle VA run stably and continuously can be lowered.

(Specific Operation)

<Cruise Control Routine>

The CPU of the DSECU 10 (hereinafter, the term "CPU" means the CPU of the DSECU 10 unless otherwise specified) is configured to execute a routine (a cruise control routine) represented by a flowchart shown in FIG. 4, every time a predetermined time elapses.

Figure 4:
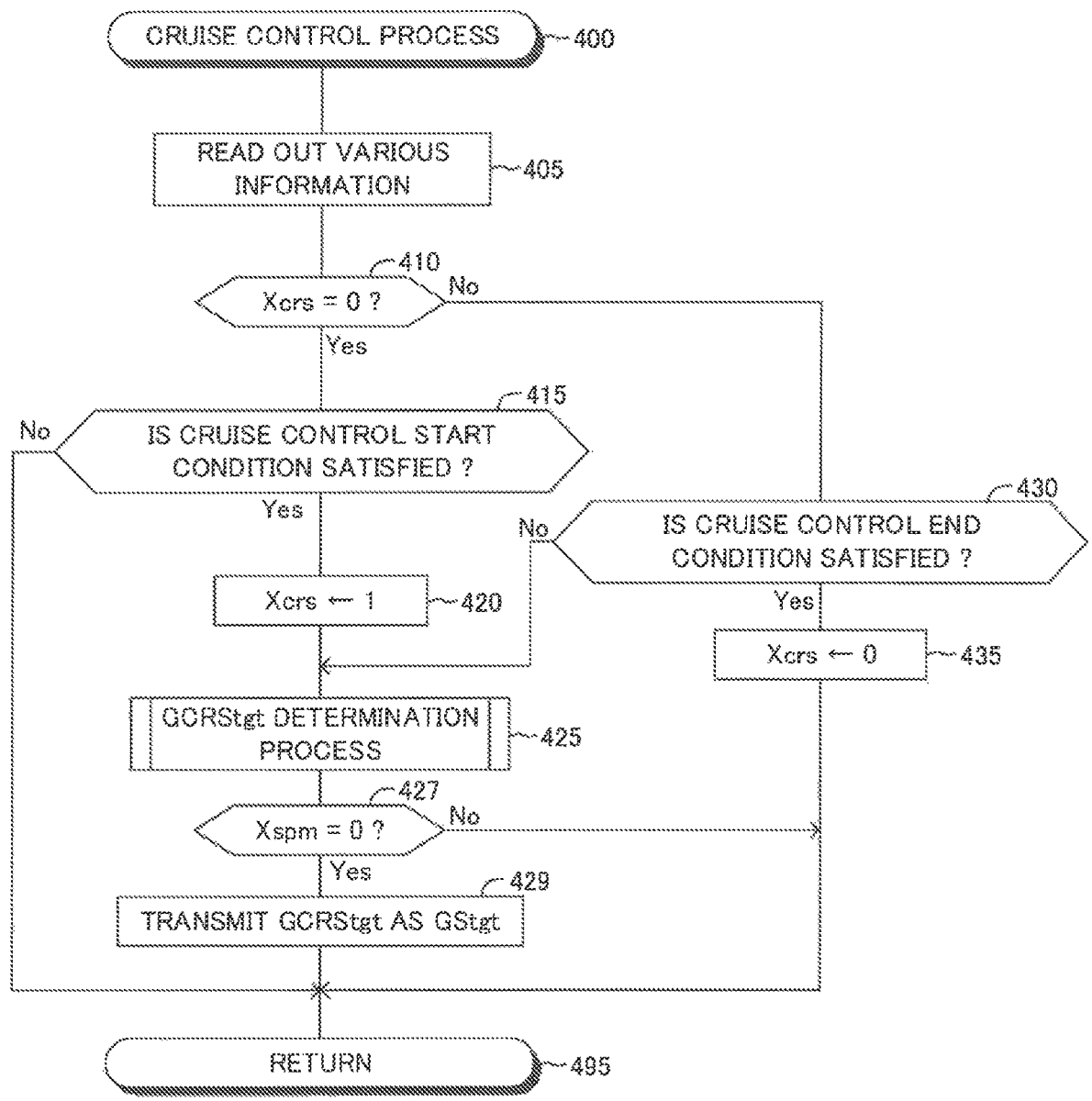
FIG. 4 is a flowchart illustrating a routine executed by a CPU of a driving support ECU (DSECU) illustrated in FIG. 1.

When a predetermined timing has come, the CPU starts processes from Step 400 shown in FIG. 4, and proceeds to Step 405 to read out (obtain) information from various devices and various sensors. Thereafter, the CPU proceeds to Step 410.

At Step 410, the CPU determines whether or not a value of a cruise control flag Xcrs is "1". The CPU sets the value of the cruise control flag Xcrs to "1", when a cruise control start condition described later becomes satisfied. The CPU sets the value of the cruise control flag Xcrs to "0", when a cruise control end condition described later becomes satisfied. Furthermore, the CPU sets the value of the cruise control flag Xcrs to "0" through an initialization routine executed when the driver performs an operation for changing a position of an ignition key switch (now shown) of the vehicle VA from an off-position to an on-position. A time period from a time point at which the cruise control start condition becomes satisfied to a time point at which the cruise control end condition becomes satisfied is a time period in which the cruise control execution condition is being satisfied. Therefore, if the value of the cruise control flag is "1", the cruise control flag indicates that the cruise control execution condition is being satisfied.

When the value of the cruise control flag Xcrs is "0", the CPU makes a "Yes" determination at Step 410, and proceeds to Step 415. At Step 415, the CPU determines whether or not the cruise control start condition for staring the cruise control is satisfied. More specifically, the CPU determines that the cruise control start condition becomes satisfied when the cruise control start signal from the cruise control operation switch 16 is received.

The cruise control start condition may include conditions (additional conditions) other than the above condition. For example, the cruise control start condition may include a condition that a lens of the camera device 12 is not clouded, and a condition that a shift lever (not shown) is located at a drive range (a "D" range). The CPU may determine that the cruise control start condition becomes satisfied when all of those conditions become satisfied.

The CPU makes a "No" determination at Step 415 when the cruise control start condition is not satisfied, and proceeds to Step 495 to tentatively terminate the present routine.

Meanwhile, if the cruise control start condition is satisfied, the CPU makes a "Yes" determination at Step 415, and proceeds to Step 420.

At Step 420, the CPU sets the value of the cruise control flag Xcrs to "1", and proceeds to Step 425. At Step 425, the CPU calculates the CRS target acceleration GCRStgt as described above (referring to the above item 1.1 and item 1.2), and proceeds to Step 427.

At Step 427, the CPU determines whether or not a value of a speed management (SPM) flag Xspm is "0". The CPU sets the value of the SPM flag Xspm to "1" when a speed management (SPM) start condition described later becomes satisfied. The CPU sets the value of the SPM flag Xspm to "0" when a speed management (SPM) end condition described later becomes satisfied. The CPU sets the value of the SPM flag Xspm to "0" through the above described initialization routine. Accordingly, if the value of the SPM flag Xspm is "1", the SPM flag indicates that a SPM execution condition for executing the speed management control is being satisfied.

When the value of the SPM flag is "0", that is when the SPM execution condition is not satisfied, the CPU makes a "Yes" determination at Step 427, and proceeds to Step 429. At Step 429, the CPU transmits the CRS target acceleration GCRStgt calculated at Step 425, as the driving support acceleration GStgt, to the engine ECU 20 and the brake ECU 30, and proceeds to Step 495 to tentatively terminate the present routine.

Whereas, if the value of the SPM flag is "1", that is, the SPM execution condition is satisfied, the CPU makes a "No" determination at Step 427, and proceeds to Step 495 to tentatively terminate the present routine. In this case, at Step 555 shown in FIG. 5, either one of the CRS target acceleration GCRStgt and the SPM target acceleration GSPMtgt, whichever is smaller, is transmitted as the driving support acceleration GStgt.

When the CPU proceeds to Step 410 in the present routine after the CPU has set the value of the cruise control flag Xcrs to "1" at Step 420, the CPU makes a "No" determination at Step 410, and proceeds to Step 430. At Step 430, the CPU determines whether or not "the cruise control end condition for ending the cruise control" is satisfied. More specifically, the CPU determines that the cruise control end condition becomes satisfied when the cruise control end signal from the cruise control operation switch 16 is received.

The cruise control end condition may include conditions (additional conditions) other than the above condition. For example, the cruise control end condition may include a condition that the lens of the camera device 12 becomes clouded, and a condition that the shift lever (not shown) is shifted to one of ranges other than the drive range. The CPU may determine that the cruise control start condition becomes satisfied when at least one of these conditions becomes satisfied.

When the cruise control end condition is not satisfied, the CPU makes a "No" determination at Step 430, and proceeds to Step 425 to execute the above described process.

Whereas, if the cruise control end condition is satisfied, the CPU makes a "Yes" determination at Step 430, and proceeds to Step 435. The CPU sets the value of the cruise control flag Xcrs to "0" at Step 435, and proceeds to Step 495 to tentatively terminate the present routine. In this case, the CPU does not execute the cruise control. In other words, the CPU does not calculate the CRS target acceleration GCRStgt.

<Speed Management Control Routine>

Figure 5:
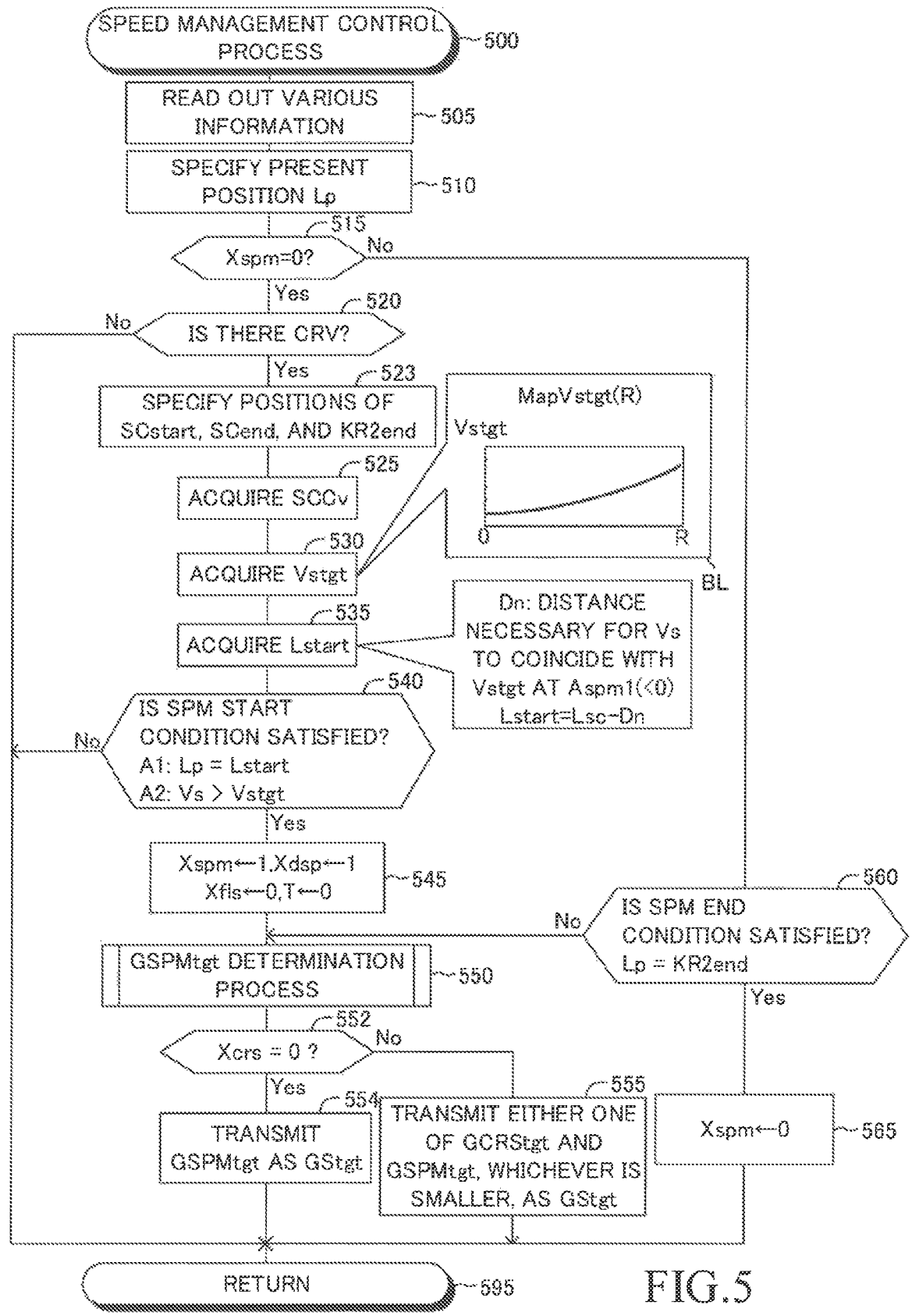
FIG. 5 is a flowchart illustrating the other routine executed by the CPU of the DSECU illustrated in FIG. 1.

The CPU of the DSECU 10 is configured to execute a routine (a speed management control routine) represented by a flowchart shown in FIG. 5, every time a predetermined time elapses.

When a predetermined timing has come, the CPU starts processes from Step 500 shown in FIG. 5 to execute Steps 505 through 510 in order, and proceeds to Step 515.

Step 505: The CPU reads out (obtain) information from various devices and various sensors.

Step 510: The CPU specifies/identifies the present position Lp of the vehicle VA based on the position signal read out from the GPS receiver 15.

Step 515: The CPU determines whether or not a value of a speed management (SPM) flag Xspm is "0". When the value of the SPM flag is "0", the CPU makes a "Yes" determination at Step 515, and proceeds to Step 520. At Step 520, the CPU determines whether or not there is the curve section CRV within the predetermined distance from the present position Lp along the self-lane in the traveling direction of the vehicle VA, based on the curvature Cv included in the map data obtained from the navigation system 14. In other words, the CPU determines whether or not the self-lane includes a section/part (that is, the curve section CRV) which has the curvature Cv larger than or equal to a predetermined value Cvth within the predetermined distance from the present position Lp.

When there is no curve section CRV, the CPU needs not to execute the speed management control. In this case, the CPU makes a "No" determination at Step 520, and proceeds to Step 595 to tentatively terminate the present routine. Consequently, the speed management control is not executed.

Whereas, if when there is the curve section CRV, the CPU makes a "Yes" determination at Step 520, and executes processes of Steps 523 through 535 described below. Thereafter, the CPU proceeds to Step 540.

Step 523: The CPU specifies/identifies the positions of "the start position SCstart and the end position SCend" of the static circle section SC and "the end position KR2end" of the second clothoid section KR2, all included in the curve CRV nearest to the present position Lp in the traveling direction of the vehicle VA in the self-lane, based on the curvature Cv included in the map data. Hereinafter, the term "curve section CRV" means this curve section CRV nearest to the present position Lp.

More specifically, the CPU specifies/identifies, as the start position SCstart, the position from which curvature Cv, which has gradually increased to a constant value to a constant value, starts remaining at the constant value. The CPU specifies/identifies, as the end position SCend, the position from which curvature Cv starts to decrease from the constant value. The CPU specifies/identifies, as the end position KR2end, the position at which curvature Cv becomes substantially equal to "0" after decreasing.

Step 525: The CPU acquires, based on the curvature Cv included in the map data, a static circle section curvature SCCv indicating the curvature Cv of the static circle section SC included in the curve section CRV.

Step 530: The CPU acquires/determines the target vehicle speed Vstgt by applying "a static circle section curvature radius SCR (=1/SCCv) which is a reciprocal of the static circle section curvature SCCv acquired at Step 525" to a target vehicle speed map MapVstgt(R). Maps mean look-up tables.

As shown in a block BL of FIG. 5, according to the target vehicle speed map MapVstgt(R), the target vehicle speed Vstgt is acquired in such a manner that the target vehicle speed Vstgt increases as the curvature radius R increases (as the curvature Cv decreases) within a range higher than "0".

Step 535: The CPU acquires/specifies the start position Lstart of the speed management control.

More specifically, the CPU acquires a vehicle speed subtraction value $\Delta Vs$ (=Vs−Vstgt) by subtracting the target vehicle speed Vstgt from the vehicle speed Vs at the present time point, and applies the vehicle speed subtraction value $\Delta Vs$ to a traveling distance map MapDn($\Delta Vs$) (not shown) so as to acquire a traveling distance Dn. The traveling distance Dn is a distance for which the vehicle VA needs to run from the present time point to a time point at which the vehicle speed Vs becomes equal to the target vehicle speed Vstgt under an assumption that the vehicle VA decelerates at the predetermined acceleration GSPM1. The traveling distance map MapDn($\Delta Vs$) defines the traveling distance Dn for which the vehicle VA needs to run from the present time point to a time point at which the vehicle speed subtraction value $\Delta Vs$ becomes equal to "0" (i.e., a distance necessary to be taken for the vehicle speed Vs to be made equal to the target vehicle speed Vstgt) under the assumption that the vehicle VA decelerates at the acceleration GSPM1. Thus, according to the traveling distance map MapDn($\Delta Vs$), the traveling distance Dn becomes longer as the vehicle speed subtraction value $\Delta Vs$ becomes larger. However, the CPU may acquire the traveling distance Dn through an arithmetic calculation based on the vehicle subtraction value $\Delta Vs$ and the acceleration GSPM1.

Next, the CPU acquires, as the start position Lstart, a position the traveling distance Dn away from the start position SCstart of the static circle section SC of the curve section CRV in/on the present position Lp's side along the self-lane.

Step 540: The CPU determines whether or not the SPM start condition is satisfied. The SPM start condition becomes satisfied when both of the following conditions A1 and A2 becomes satisfied.

A1: The present position Lp is the start condition Lstart.

A2: The vehicle speed Vs at the present time point is higher than the target vehicle speed Vstgt.

When at least one of the conditions A1 and A2 is unsatisfied, the CPU makes a "No" determination at Step 540, and proceeds to Step 595 to tentatively terminate the present routine. As a result, the speed management control is not executed.

Whereas, when both of the conditions A1 and A2 are satisfied, the CPU makes a "Yes" determination at Step 540, and executes processes of Steps 545 and 550 in order described below. Thereafter, the CPU proceeds to Step 552.

Step 545: The CPU sets values of the SPM flag Xspm and a display flag Xdsp to "1", and sets values of a blinking flag and a timer T to "0".

The CPU sets the value of the display flag Xdsp to "1" when the SPM display element DEspm is displayed continuously. The CPU sets the value of the display flag Xdsp to "0" when the SPM display element DEspm is not displayed. The CPU sets the value of the display flag Xdsp to "0" through the initialization routine.

The CPU sets the value of the blinking flag Xfls to "1" when the SPM display element DEspm is blinked. The CPU sets the value of the blinking flag Xfls to "0" when the SPM display element DEspm is not blinked. The CPU sets the value of the blinking flag Xfls to "0" through the initialization routine.

The timer T is a timer indicating a time elapsing from a time point at which the SPM display element DEspm starts to be blinked.

Step 550: The CPU executes a SPM target acceleration GSPMtgt determination process described later with reference to FIG. 6 to determinate the SPM target acceleration GSPMtgt.

Step 552: The CPU determines whether or not the value of the cruise control flag Xcrs to "0".

When the value of the cruise control flag Xcrs is "0", that is, when the cruise control execution condition is not satisfied, the CPU makes a "Yes" determination at Step 552, and proceeds to Step 554. At Step 554, the CPU transmits the SPM target acceleration GSPMtgt acquired at Step 550 to the engine ECU 20 and the brake ECU 30, as the driving support target acceleration GStgt, and proceeds to Step 595 to tentatively terminate the present routine.

Whereas, when the value of the cruise control flag Xcrs is "1", that is, when the cruise control execution condition is satisfied, the CPU makes a "No" determination at Step 552, and proceeds to Step 555. At Step 555, the CPU transmits either one of the CRS target acceleration GCRStgt and the SPM target acceleration GSPMtgt, whichever is smaller, to the engine ECU 20 and the brake ECU 30, as the driving support target acceleration GStgt. Thereafter, the CPU proceeds to Step 595 to tentatively terminate the present routine.

When the present routine is executed after the CPU has set the value of the SPM flag Xspm to "1" at Step 545 and proceeds to Step 515, the CPU makes a "No" determination at Step 515, and proceeds to Step 560.

At Step 560, the CPU determines whether or not the SPM end condition is satisfied. The SPM end condition becomes satisfied when the present position Lp reaches the end position KR2end of the second clothoid section KR2 (that is, the end position of the curve section CRV).

When the present position Lp has not reached the end position KR2end of the second clothoid section KR2 yet, the CPU makes a "No" determination at Step 560, and executes the processes at and after Step 550 described above.

Whereas, when the present position Lp reaches the second clothoid section KR2end of the second clothoid section KR2, the CPU makes a "Yes" determination at Step 560, and proceeds to Step 565. At Step 565, the CPU sets the value of the SPM flag Xspm to "0", and proceeds to Step 595 to tentatively terminate the present routine.

<Process for Determining (Calculating) SPM Target Acceleration GSPMtgt>

Figure 6:
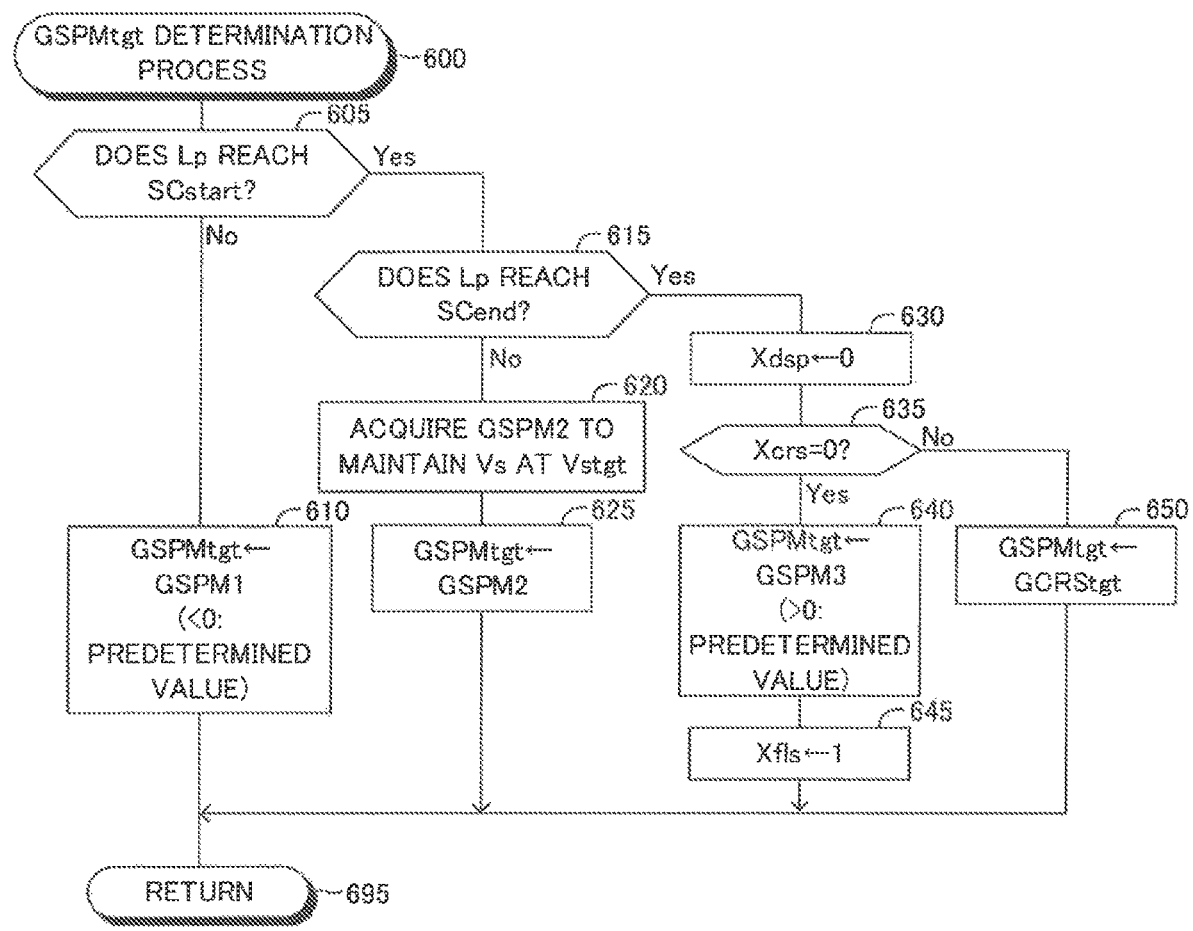
FIG. 6 is a flowchart illustrating a routine which the CPU executes when proceeding to a GSPMtgt determination process in the routine illustrated in FIG. 5.

When the CPU proceeds to Step 550 shown in FIG. 5, the CPU starts the processes of a subroutine represented by a flowchart shown in FIG. 6 from Step 600, and proceeds to Step 605. At Step 605, the CPU determines whether or not the present position Lp reaches the start position SCstart of the static circle section SC specified/identified at Step 523 shown in FIG. 5.

When the present position Lp has not reached the start position SCstart of the static circle section SC yet, the CPU makes a "No" determination at Step 605, and proceeds to Step 610. At Step 610, the CPU sets the SPM target acceleration GSPMtgt to the predetermined negative GSPM1, and proceeds to Step 695 to tentatively terminate the present routine.

Whereas, when the present position Lp has reached the start position SCstart of the static circle section SC, the CPU makes a "Yes" determination at Step 605, and proceeds to Step 615. At Step 615, the CPU determines whether or not the present position Lp reaches the end position SCend of the static circle section SC specified/identified at Step 523 shown in FIG. 5.

When the present position Lp has not reached the end position SCend of the static circle SC yet, that is, when the vehicle VA is traveling in the static circle section SC, the CPU makes a "No" determination at Step 615. Thereafter, the CPU executes processes of Steps 620 and 625 described below in this order, and proceeds to Step 695 to tentatively terminate the present routine.

Step 620: The CPU calculates the acceleration GSPM2 to maintain the vehicle speed Vs at the target vehicle speed Vstgt.

More specifically, the CPU sets the acceleration GSPM2 to a predetermined positive constant acceleration GPLS, when the vehicle speed Vs is lower than the target vehicle speed Vstgt. Whereas, the CPU sets the acceleration GSPM2 to a predetermined negative constant acceleration (−GPLS), when the vehicle speed Vs is higher than the target vehicle speed Vstgt.

Step 625: The CPU sets the SPM target acceleration GSPMtgt to the acceleration GSPM2 calculated at Step 620.

Whereas, when the present position Lp has reached the end position SCend of the static circle section SC (that is, the vehicle VA ends traveling in the static circle section SC to enter the second clothoid section KR2), the CPU makes a "Yes" determination at Step 615, and proceeds to Step 630.

At Step 630, the CPU sets the value of the display flag Xdsp to "0" in order to stop/end displaying the SPM display element DEspm, and proceeds to Step 635. At Step 635, the CPU determines whether or not the value of the cruise control flag Xcrs is "0".

When the value of the cruise control flag is "0", that is, when the cruise control execution condition is not satisfied, the CPU makes a "Yes" determination at Step 635, and executes processes of Steps 640 and 645 described below in this order. Thereafter, the CPU proceeds to Step 695 to tentatively terminate the present routine.

Step 640: The CPU sets the SPM target acceleration GSPMtgt to the predetermined positive acceleration GSPM3. For example, the acceleration GSPM3 is a positive acceleration of which magnitude is the same as the magnitude of the negative acceleration GSPM1 used through the deceleration control. In some embodiments, the acceleration GSPM3 may be set to an acceleration which enables the vehicle speed Vs to become equal to the vehicle speed Vs which was observed immediately before the speed management control was started at a time point at which the vehicle VA reaches the end position KR2end of the second clothoid section KR2.

Step 645: The CPU sets the value of the blinking flag Xfls to "1" in order to start blinking the SPM display element DEspm.

Whereas, when the value of the cruise control flag Xcrs is "1", that is, the cruise control execution condition is satisfied, the CPU makes a "No" determination at Step 635, and proceeds to Step 650.

At Step 650, the CPU sets the SPM target acceleration GSPMtgt to the CRS target acceleration GCRStgt calculated at Step 425 shown in FIG. 4, and proceeds to Step 695 to tentatively terminate the present routine. In this case, at Step 555 shown in FIG. 5, the CPU transmits the CRS target acceleration GCRStgt as the driving support target acceleration GStgt. In some embodiments, at Step 650, the CPU may set the SPM target acceleration GSPMtgt to an extraordinarily large value which is impossible in a normal travel. Also, in this case, at Step 555 shown in FIG. 5, the CPU transmits the CRS target acceleration GCRStgt as the driving support target acceleration GStgt.

<Request Transmission Routine>

Figure 7:
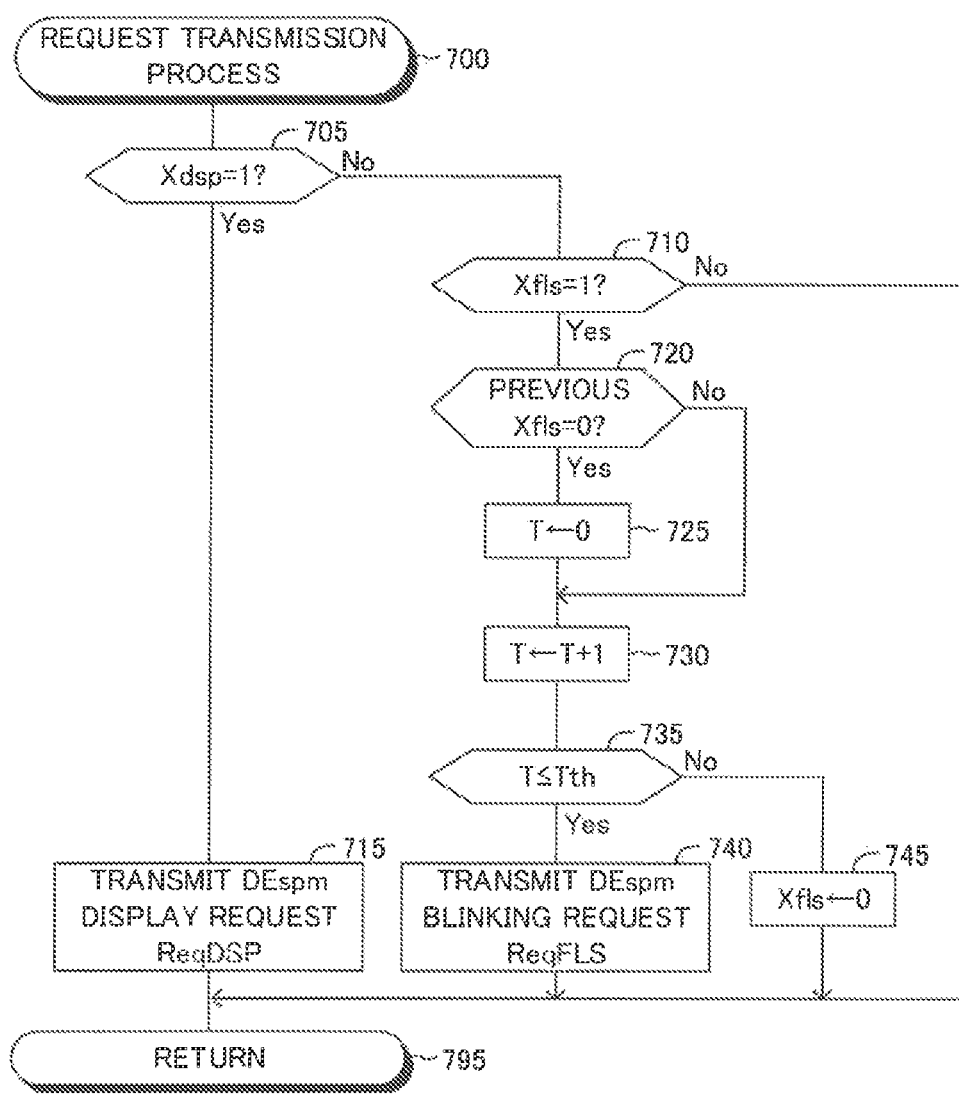
FIG. 7 is a flowchart illustrating the other routine executed by the CPU of the DSECU illustrated in FIG. 1.

The CPU is configured to execute a routine (a request transmission routine) represented by a flowchart shown in FIG. 7, every time a predetermined time elapses.

When a predetermined timing has come, the CPU starts processes from Step 700 shown in FIG. 7, and proceeds to Step 705. At Step 705, the CPU determines whether or not the value of the display flag Xdsp is "1".

When the value of the display flag Xdsp is "0", the CPU makes a "No" determination at step 705, and proceeds to Step 710. At Step 710, the CPU determines whether or not the value of the blinking flag Xfls is "1".

When the value of the blinking flag Xfls is "0", the CPU makes a "No" determination at Step 710, and proceeds to Step 795 to tentatively terminate the present routine.

When the vehicle VA reaches the start position Lstart (that is, when the SPM start condition is satisfied), the value of the display flag Xdsp is set to "1" at Step 545 shown in FIG. 5. In this case, the CPU makes a "Yes" determination at Step 705, and proceeds to Step 715. At Step 715, the CPU transmits "a DEspm display request ReqDSP which is a request for displaying the SPM display element DEspm on the display 42" to the display ECU 40, and proceeds to Step 795 to tentatively terminate the present routine. When the display ECU 40 receives the DEspm display request ReqDSP, the display ECU 40 displays (continuously) the SPM display element DEspm on the display 42.

When the cruise control is not being executed at the time point at which the vehicle VA reaches the end position SCend of the static circle section SC, the value of the display flag Xdsp is set to "0" at Step 630 shown in FIG. 6, and the value of the blinking flag Xfls is set to "1" at Step 645. In this case, when the CPU proceeds to Step 705 in the routine shown in FIG. 7, the CPU makes a "No" determination at Step 705, and proceeds to Step 710. The CPU makes a "Yes" determination at Step 710, and proceeds to Step 720.

At Step 720, the CPU determines whether or not the value of the blinking flag Xfls (hereinafter, referred to as "a previous blinking flag Xfls") whose value was set through the present routine previously executed (at the most recent time point) was "0". When the value of the previous blinking flag Xfls was "0", the CPU makes a "Yes" determination at Step 720, and executes processes of Steps 725 and 730 described below in this order. Thereafter, the CPU proceeds to Step 735.

Step 725: The CPU sets the value of the timer T to "0".
Step 730: The CPU adds "1" to the value of the timer (or increment the value of the timer by "1").
Step 735: The CPU determines whether or not the value of the timer T is equal to or smaller than a threshold Tth.

When the value of the timer T is equal to or smaller than the threshold Tth, the CPU makes a "Yes" determination at Step 735, and proceeds to Step 740. At Step 740, the CPU transmits "a DEspm blinking request ReqFLS which is a request for blinking the SPM display element DEspm on the display 42" to the display ECU 40. Thereafter, the CPU proceeds to Step 795 to tentatively terminate the present routine. When the display ECU 40 receives the DEspm blinking request ReqFLS, the display ECU 40 blinks the SPM display element DEspm on the display 42.

Whereas, when the value of the previous blinking flag was "1", the CPU makes a "No" determination at Step 720, and directly proceeds to Step 730.

When the CPU proceeds to Step 735, the CPU makes a "No" determination at Step 735, if the value of the timer T is larger than the threshold Tth. In this case, the CPU proceeds to Step 745 and sets the value of the blinking flag Xfls to "0". Thereafter, the CPU proceeds to Step 795 to tentatively terminate the present routine.

As described above, when the vehicle VA reaches the end position SCend of the static circle section SC so that the vehicle speed upper limit control is ended/stopped, the present control device blinks the SPM display element DEspm, if the cruise control execution condition is not satisfied. Whereas, when the vehicle VA reaches the end position SCend of the static circle section SC so that the vehicle speed upper limit control is ended/stopped, the present control device ends/stops displaying the SPM display element DEspm immediately, if the cruise control execution condition is satisfied. When the vehicle speed upper limit control is ended/stopped, the driver does not have to perform the acceleration-deceleration operation, if the cruise control condition is satisfied. Therefore, in this case, the present control device ends/stops displaying the SPM display element DEspm immediately. In other words, the SPM display element DEspm doses not start to be blinked. Accordingly, the possibility that blinking the SPM display element DEspm annoys the driver can be lowered. Furthermore, the possibility that the driver erroneously notices that the driver needs to perform the acceleration-deceleration operation can be lowered.

First Modification Example

A vehicle control device (hereinafter, referred to as "a first modification device") according to a first modification example of the present control device will be described. The first modification device differs from the above described present control device only in that the SPM end condition becomes satisfied when the vehicle VA reaches the end position SCend of the static circle section SC (referring to a time point td shown in FIG. 8).

Figure 8:
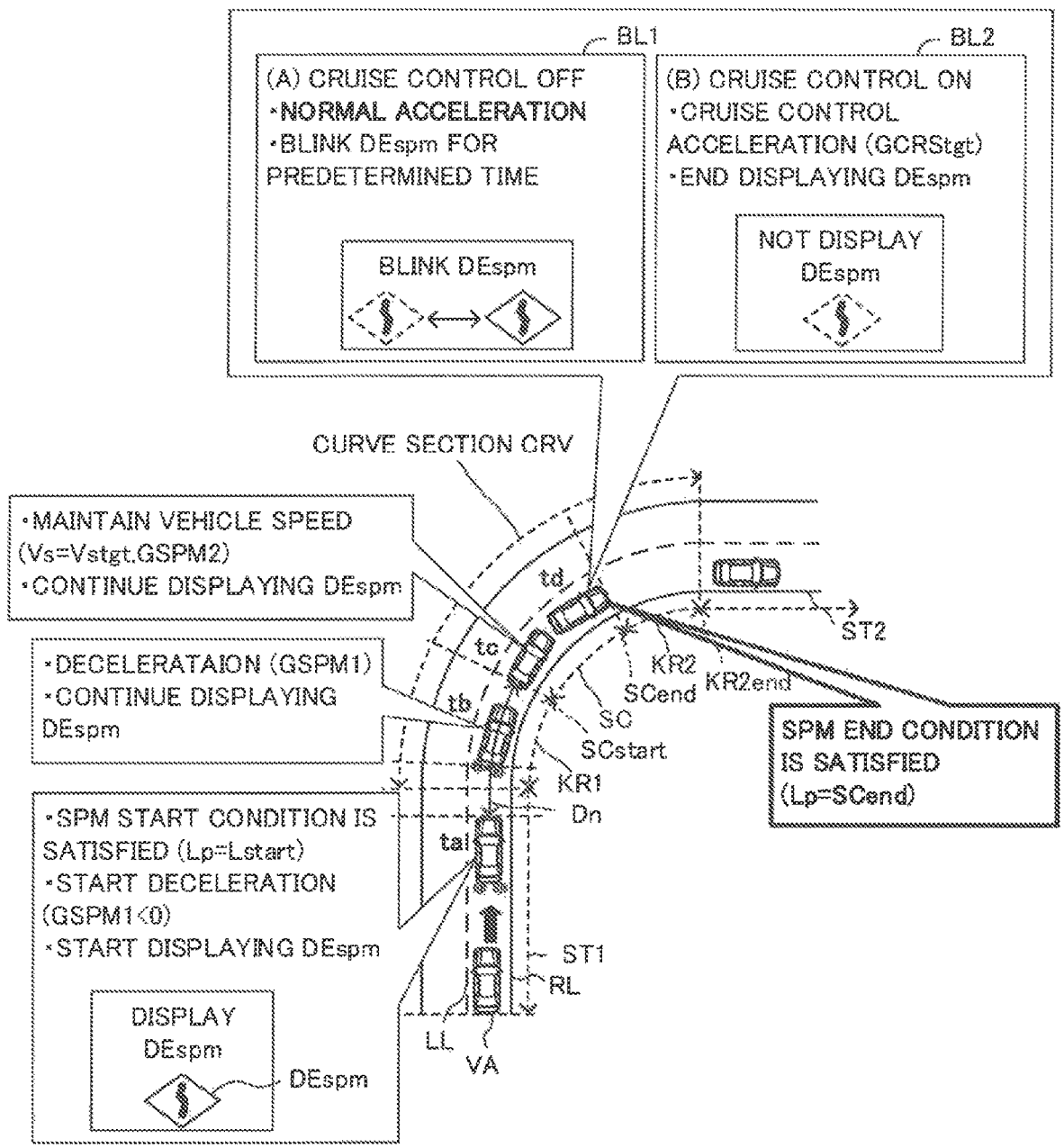
FIG. 8 is a diagram illustrating an operation of the present control device according to a first modification example when the vehicle travels in the curve section.

When the cruise control execution condition is not satisfied at the time point td shown in FIG. 8, the first modification device starts to execute an normal acceleration control. Through the normal acceleration control, the engine ECU 20 controls the actual throttle valve opening degree TA in accordance with the target throttle valve opening degree TAtgt determined based on the acceleration operation amount AP. Furthermore, in this case, the first modification device starts blinking the SPM display element DEspm at the time point td.

Whereas, when the cruise control execution condition is satisfied at the time point td, the first modification device controls the vehicle VA in such a manner that the actual acceleration dg is made equal to the CRS target acceleration GCRStgt calculated through the cruise control. Furthermore, in this case, the first modification device ends/stops displaying the SPM display element DEspm at the time point td.

Figure 9:
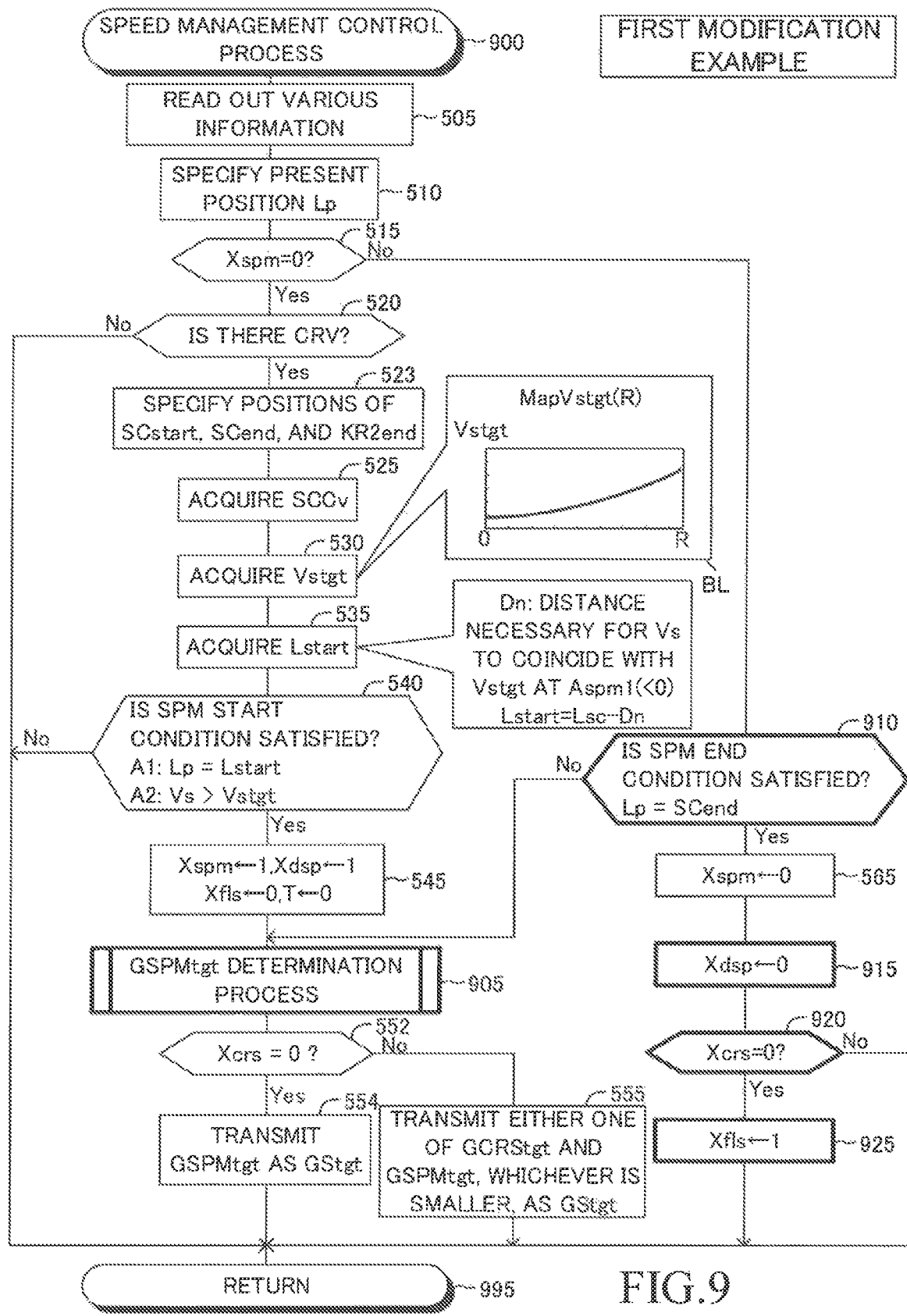
FIG. 9 is a flowchart illustrating a routine executed by the CPU of the present control device according to the first modification.

The CPU of the DSECU 10 of the first modification device executes the substantially same routines as the routines executed by the CPU of the DSECU 10 of the present control device. Note, however that, the CPU of the first modification device executes a routine represented by a flowchart shown in FIG. 9 in place of the routine represented by the flowchart shown in FIG. 5. In FIG. 9, the same Steps as the Steps shown in FIG. 5 are denoted with common symbols for the Steps in FIG. 5, and description thereof is omitted.

When a predetermined timing has come, the CPU starts processes from Step 900 shown in FIG. 9. The CPU executes process of Step 905 in place of Step 550 shown in FIG. 5, and proceeds to Step 552 shown in FIG. 9 during a time period from a time point at which the SPM start condition becomes satisfied to a time point at which the SPM end condition becomes satisfied.

At Step 905, the CPU executes a SPM target acceleration GSPMtgt determination process described later with reference to FIG. 10 to determine the SPM target acceleration GSPMtgt.

When the value of the SPM flag has been set to "1", the CPU makes a "No" determination at Step 515 shown in FIG. 9, and proceeds to Step 910.

At Step 910, the CPU determines whether or not the SPM end condition is satisfied. The SPM end condition is satisfied when the present position Lp reaches the end position SCend of the static circle section SC.

When the present position Lp has not reached the end position SCend yet, the CPU makes a "No" determination at Step 910, and proceeds to Step 905 to execute a process described later. Whereas, when the present position Lp reaches the end position SCend, the CPU makes a "Yes" determination at Step 910, and sets the value of the SPM flag Xspm to "0" at Step 565. Thereafter, the CPU proceeds to Step 915 to set the value of the display flag Xdsp to "0", and proceeds to Step 920.

At Step 920, the CPU determines whether or not the value of the cruise control flag Xcrs is "0". When the value of the cruise control flag Xcrs is "0", the CPU makes a "Yes" determination at Step 920, and proceeds to Step 925. If the value of the cruise control flag Xcrs is "0", the cruise control execution condition is not satisfied when the vehicle VA reaches the end position SCend of the static circle section SC. Accordingly, at Step 925, the CPU sets the value of the blinking flag Xfls to "1" in order to blink the SPM display element DEspm. Thereafter, the CPU proceeds to Step 995 to tentatively terminate the present routine.

Whereas, if the value of the cruise control flag is "1", the CPU makes a "No" determination at Step 920, and directly proceeds to Step 995 to tentatively terminate the present routine.

Figure 10:
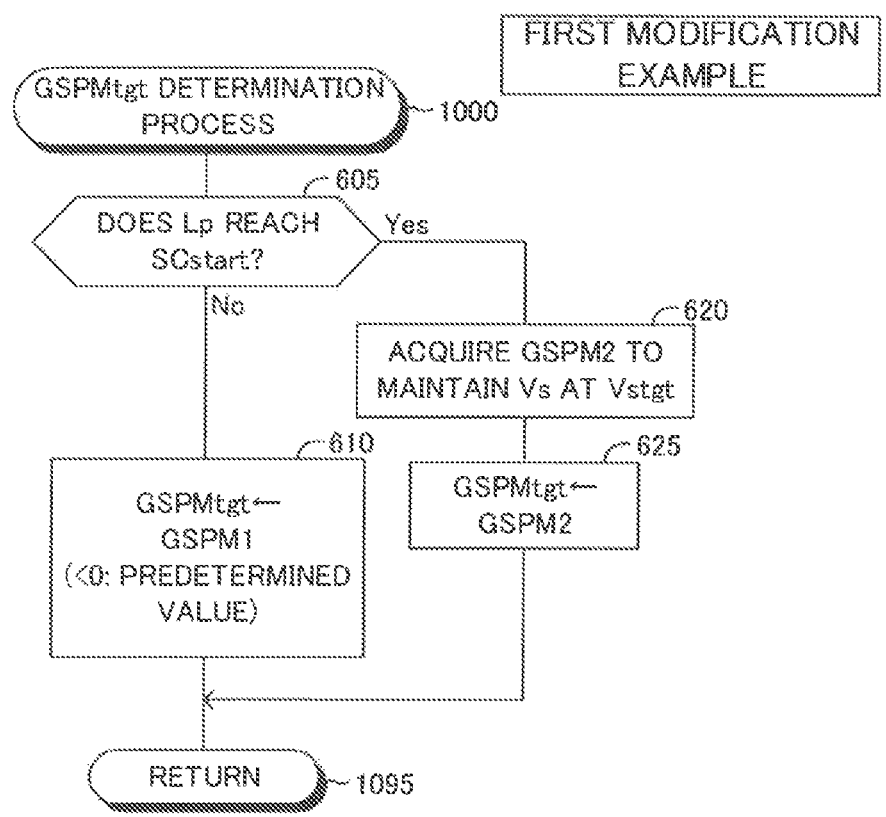
FIG. 10 is a flowchart illustrating a routine which the CPU of the present control device according to the first modification executes when proceeding to a GSPMtgt determination process in the routine illustrated in FIG. 9.

When the CPU proceeds to Step 905 shown in FIG. 9, the CPU starts processes of a subroutine represented by a flowchart shown in FIG. 10 from Step 1000. In FIG. 10, the same Steps as the Steps shown in FIG. 6 are denoted with common symbols for the Steps in FIG. 6, and description thereof is omitted.

First, the CPU proceeds to Step 605 shown in FIG. 10. When the present position Lp has not reached the start positon SCstart of the static circle section SC yet, the CPU makes a "No" determination at Step 605. Thereafter, the CPU sets the SPM target acceleration GSPMtgt to the predetermined negative acceleration GSPM1 at Step 610 shown in FIG. 10, and proceeds to Step 1095 to tentatively terminate the present routine.

Whereas, when the present position Lp reaches the start position SCstart of the static circle section SC, the CPU makes a "Yes" determination at Step 605 shown in FIG. 10, and executes processes of Steps 620 and 625 shown in FIG. 10. Thereafter, the CPU proceeds to Step 1095 to tentatively terminate the present routine. Consequently, the CPU sets the SPM target acceleration GSPMtgt to the acceleration GSPM2.

As described above, a part of the above embodiment can be applied to the vehicle control device configured to end/stop the speed management control when the vehicle VA reaches the end position SCend of the static circle section SC. That is, when the vehicle VA reaches the end position SCend of the static circle section SC so that the speed management control is ended/stopped, the CPU sets the value of the display flag Xdsp to "0" at Step 915 shown in FIG. 9. Thereafter, if the value of the cruise control flag Xcrs is "0", the CPU sets the blinking flag Xfls to "1" at Step 925. Whereas, if the value of the cruise control Xcrs is "1", the CPU does not proceed to Step 925. In other words, the CPU does not set the value of the blinking flag Xfls to "1", so that the value of the blinking flag Xfls remains at "0".

According to the above configuration, when the vehicle VA reaches the end position SCend of the static circular section SC, the CPU starts blink the SPM display element DEspm, if the cruise control execution condition is not satisfied. Whereas, if the cruise control execution condition is satisfied, the CPU ends/stops displaying the SPM display element DEspm immediately.

Second Modification Example

A vehicle control device (hereinafter, referred to as "a second modification device") according to a second modification example of the present control device will be described. The second modification device differs from the above described present control device only in that the second modification device uses the yaw rate YR measured by the yaw rate sensor 17 to determine whether the vehicle VA reaches various positions including the start position SCstart of the static circle section SC, the end SCend of the static circle section SC, and the end position KR2end of the second clothoid section KR2.

When the DSECU 10 executes the process of Step 510 shown in FIG. 5, the DSECU 10 specifies/identifies the present position Lp, and calculates the curvature Cv based on the yaw rate Yr. That method for calculating the curvature Cv using the yaw rate is a well-known method, and is disclosed in Japanese Patent Application Laid-open No. 2009-51487, WO 2010/073300, and the like.

In this method, the DSECU 10 acquires the curvature radius R by applying the yaw rate Yr and the vehicle speed Vs to the following equation (2). Thereafter, the CPU acquires the reciprocal of the curvature Cv as the curvature radius R (=1/Cv).

$$R = Vs/Yr \qquad (2)$$

When the curvature Cv acquired at the present time point (hereinafter, referred to as "a present curvature Cv1") satisfies the following condition B1 and the curvature Cv previously acquired a predetermine before the present time point (i.e., acquired last, at the most recent time point) (hereinafter, referred to as "a previous curvature Cv") satisfies the following condition B2, the DSECU 10 determines that the vehicle VA reaches the start position SCstart of the static circle section SC.

B1: the present curvature Cv1=the static circle section curvature SCCv

B2: the previous curvature Cv2<the static circle section curvature SCCv

The the previous curvature Cv2 satisfying the condition B2 may referred to as a first predetermined curvature Cvp1.

Furthermore, when the present curvature Cv1 satisfies the following condition C1 and the previous curvature Cv2 satisfies the following condition C2, the DSECU 10 determines that the vehicle VA reaches the end position SCend of the static circle section SC.

C1: the present curvature Cv1=the first predetermined curvature Cvp1<the static circle section curvature SCCv C2: the previous curvature Cv2=the static circle section curvature SCCv Furthermore, when the present curvature Cv1 satisfies the following condition D1 and the previous curvature Cv2 satisfies the following curvature D2, the DSECU 10 determines that the vehicle VA reaches the end position KR2end of the second clothoid section KR2.

D1: the present curvature Cv1=0

D2: the previous curvature Cv2>0

The present disclosure is not limited to the above described embodiments and modifications, and can adopt various another modifications within a scope of the present disclosure.

In some embodiments, if the cruise control execution condition is not satisfied when the vehicle VA reaches the end position SCend of the static circle section SC, the DSECU 10 may display the SPM display element DEspm in a display mode (a second display mode) which is different from a display mode (a first display mode) in which the DSECU 10 displayed the SPM display element DEspm before the vehicle reaches the end position SCend.

For example, in the above embodiments, the first display mode is a display mode in which the SPM display element DEspm is lighted (displayed), whereas the second display mode is a display mode in which the SPM display element DEspm is blinked. However, the second display mode may be a mode in which a frame of the SPM display element DEspm is highlighted.

In the above embodiments, when the vehicle VA reaches the end position SCend (the control end position) of the static circle section SC, the vehicle speed maintaining control is ended/stopped. However, the control end position is not limited to the end position SCend.

In some embodiments, the control end position may be a predetermined position included in a section from a predetermined first position to the end position KR2end of the second clothoid section KR2. The first position is a position a predetermined distance away in/on a side of the end position SCend from a midway/middle position between the start position SCstart of the static circle section SC and the end position SCend of the static circle section SC.

In the above embodiments, the DSECU 10 determines that the SPM start condition is satisfied when both of the conditions A1 and A2 are satisfied. In some embodiments, the DSECU 10 may determine that the SPM start condition is satisfied when only the condition A1 is satisfied.

When a stereo camera device which can measure a distance to the obstacle accurately is adopted/employed as the camera device 12, the above described vehicle control device does not have to comprise the millimeter wave radar device 13.

The millimeter wave radar device 13 may be any device/sensor which transmits/emits a wireless medium to detect the obstacle by receiving a reflected wireless medium by the obstacle.

What is claimed is:

1. A vehicle control device comprising:
   sensing devices configured to acquire information on at least a traveling state of a vehicle;
   actuators configured to control the traveling state of the vehicle; and
   a controller configured to:
   execute a cruise control to let the vehicle travel using the information and the actuators in such a manner that an acceleration of the vehicle is equal to a predetermined cruise control acceleration; and
   start a vehicle speed upper limit control to let the vehicle travel using the information and the actuators in such a manner that a vehicle speed of the vehicle does not exceed a vehicle speed upper limit value determined based on a shape of a curve section, when a start condition becomes satisfied, the start condition being a condition which is satisfied at least when the vehicle reaches a predetermined control start position defined with respect to a start position of the curve section regardless of whether or not the cruise control is being executed,
   wherein the controller is configured to:
      start displaying a predetermined display element, when the vehicle speed upper limit control is started;
      end the vehicle speed upper limit control, when the vehicle reaches a predetermined control end position defined with respect to an end position of the curve section while the vehicle speed upper limit control is being executed;
      end displaying the predetermined display element in a first mode when the cruise control is being executed at the predetermined control end position;
      in the first mode, end displaying the predetermined display element without blinking the predetermined display element;
      end displaying the predetermined display element in a second mode which is different from the first mode when the cruise control is not being executed at the predetermined control end position; and
      in the second mode, end displaying the predetermined display element after blinking the predetermined display element.

2. The vehicle control device according to claim 1, wherein the curve section includes:
   a first clothoid section in which a curvature gradually increases up to a constant value;
   a static circle section in which the curvature remains at the constant value; and
   a second clothoid section in which the curvature gradually decreases from the constant value,
   wherein the vehicle control device is configured to determine that the vehicle reaches the predetermined control end position when the vehicle reaches an end position of the static circle section.

3. A vehicle control method for controlling a vehicle, the vehicle control method comprising the steps of:
   executing a cruise control to let the vehicle travel using information on at least a traveling state of the vehicle and actuators of the vehicle in such a manner that an acceleration of the vehicle is equal to a predetermined cruise control acceleration;
   starting a vehicle speed upper limit control to let the vehicle travel using the information and the actuators in such a manner that a vehicle speed of the vehicle does not exceed a vehicle speed upper limit value determined based on a shape of a curve section, when a start condition becomes satisfied, the start condition being a condition which is satisfied at least when the vehicle reaches a predetermined control start position defined with respect to a start position of the curve section regardless of whether or not the cruise control is being executed;
   starting displaying a predetermined display element, when the vehicle speed upper limit control is started;
   ending the vehicle speed upper limit control, when the vehicle reaches a predetermined control end position defined with respect to an end position of the curve section while the vehicle speed upper limit control is being executed;
   ending displaying the predetermined display element in a first mode when the cruise control is being executed at the predetermined control end position;
   ending displaying the predetermined display element in the first mode without blinking the predetermined display element;
   end displaying the predetermined display element in a second mode which is different from the first mode when the cruise control is not being executed at the predetermined control end position; and
   ending displaying the predetermined display element in the second mode after blinking the predetermined display element.

4. The vehicle control method according to claim 3, wherein the curve section includes:
   a first clothoid section in which a curvature gradually increases up to a constant value;
   a static circle section in which the curvature remains at the constant value; and
   a second clothoid section in which the curvature gradually decreases from the constant value, and
   determining that the vehicle reaches the predetermined control end position when the vehicle reaches an end position of the static circle section.

5. A computer-readable storage medium storing a program for causing an electronic control unit to execute a process, comprising the steps of:
   executing a cruise control to let a vehicle travel using information on at least a traveling state of the vehicle and actuators of the vehicle in such a manner that an acceleration of the vehicle is equal to a predetermined cruise control acceleration;
   starting a vehicle speed upper limit control to let the vehicle travel using the information and the actuators in such a manner that a vehicle speed of the vehicle does not exceed a vehicle speed upper limit value determined based on a shape of a curve section, when a start condition becomes satisfied, the start condition being a condition which is satisfied at least when the vehicle reaches a predetermined control start position defined with respect to a start position of the curve section regardless of whether or not the cruise control is being executed;
   starting displaying a predetermined display element, when the vehicle speed upper limit control is started;
   ending the vehicle speed upper limit control, when the vehicle reaches a predetermined control end position defined with respect to an end position of the curve section while the vehicle speed upper limit control is being executed;

ending displaying the predetermined display element in a first mode when the cruise control is being executed at the predetermined control end position;

ending displaying the predetermined display element in the first mode without blinking the predetermined display element;

end displaying the predetermined display element in a second mode which is different from the first mode when the cruise control is not being executed at the predetermined control end position; and ending displaying the predetermined display element in the second mode after blinking the predetermined display element.

6. The computer-readable storage medium according to claim 5, wherein the curve section includes:

a first clothoid section in which a curvature gradually increases up to a constant value;

a static circle section in which the curvature remains at the constant value; and a second clothoid section in which the curvature gradually decreases from the constant value, and wherein the process further comprises determining that the vehicle reaches the predetermined control end position when the vehicle reaches an end position of the static circle section.

* * * * *